(12) United States Patent
Gallick et al.

(10) Patent No.: US 6,882,641 B1
(45) Date of Patent: Apr. 19, 2005

(54) CALL CENTER QUEUE ADMINISTRATION

(75) Inventors: Robert Lawrence Gallick, Phoenix, AZ (US); James Franklin Hewell, Glendale, AZ (US); John Wesley Spenik, Phoenix, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/511,256

(22) Filed: Feb. 23, 2000

(51) Int. Cl.$^7$ ............................................... H04L 12/66
(52) U.S. Cl. .................. 370/356; 370/252; 370/353; 370/395.52; 370/401; 379/88.11; 379/265.11; 379/266.01; 709/207
(58) Field of Search ................................ 370/230, 252, 370/352, 353, 354, 355, 356, 395.52, 401, 402; 379/88.11, 88.12, 265.11, 265.13, 265.14, 266.01, 266.02, 266.03; 709/206, 207

(56) References Cited

U.S. PATENT DOCUMENTS

| | | | | |
|---|---|---|---|---|
| 5,926,537 A | * | 7/1999 | Birze | 370/252 |
| 6,078,650 A | * | 6/2000 | Hansen | 379/52 |
| 6,133,912 A | * | 10/2000 | Montero | 345/327 |
| 6,215,865 B1 | * | 4/2001 | McCalmont | 379/212.01 |
| 6,259,786 B1 | * | 7/2001 | Gisby | 379/266 |
| 6,308,203 B1 | * | 10/2001 | Itabashi et al. | 709/217 |
| 6,310,944 B1 | * | 10/2001 | Brisebois et al. | 379/142.01 |
| 6,377,944 B1 | * | 4/2002 | Busey et al. | 370/389 |
| 6,408,066 B1 | * | 6/2002 | Andruska et al. | 379/265.12 |
| 6,449,357 B1 | * | 9/2002 | Sashihara | 379/265.09 |
| 6,515,964 B1 | * | 2/2003 | Cheung et al. | 370/230 |
| 2001/0043589 A1 | * | 11/2001 | Kikinis | 370/352 |

\* cited by examiner

Primary Examiner—Dang Ton
Assistant Examiner—Shick Hom

(57) ABSTRACT

A feature server, e.g., a stored program controller, processes calls to a subscriber's main directory number in a packet network by submitting a subscriber-administered questionnaire to callers. The information in the questionnaire, when completed by the calling party, can be used to automatically route the call or to reposition the call in the incoming call queue. Alternatively, the completed, or even partially completed questionnaire may be displayed in a "pop up" window to a subscriber's operator who can then use the information to assist the caller or, without need of answering the call, to reposition the call within the queue or to divert the call to another directory number. In addition, information previously provided in a questionnaire completed by a caller is stored so that when the caller calls again, the stored information may be employed to more efficiently process the call.

7 Claims, 22 Drawing Sheets

| Time-Date of Call | Caller-ID Name-Number | Return Caller | Queue Position | IGF Status | Time in Queue | Called Party or DN | Purpose of Call | Urgent or Priority |
|---|---|---|---|---|---|---|---|---|
| 4000 | 4010 | 4020 | 4030 | 4040 | 4050 | 4060 | 4070 | 4080 |
| 13:05:06 12-25-99 | Sidney  555-820-1994 | Y | 1 | Complete | 00:01:23 | (Main Number) | Cust. Service | P |
| 13:08:02 12-25-99 | Natasha  555-234-7654 | N | 3 | 00:03:02 | 00:03:23 | Buster | Unknown | |
| 13:06:00 12-25-99 | Fred  555-743-8254 | N | 2 | Complete | 00:01:03 | Kyle | Order Entry | |

Call Queue Screen

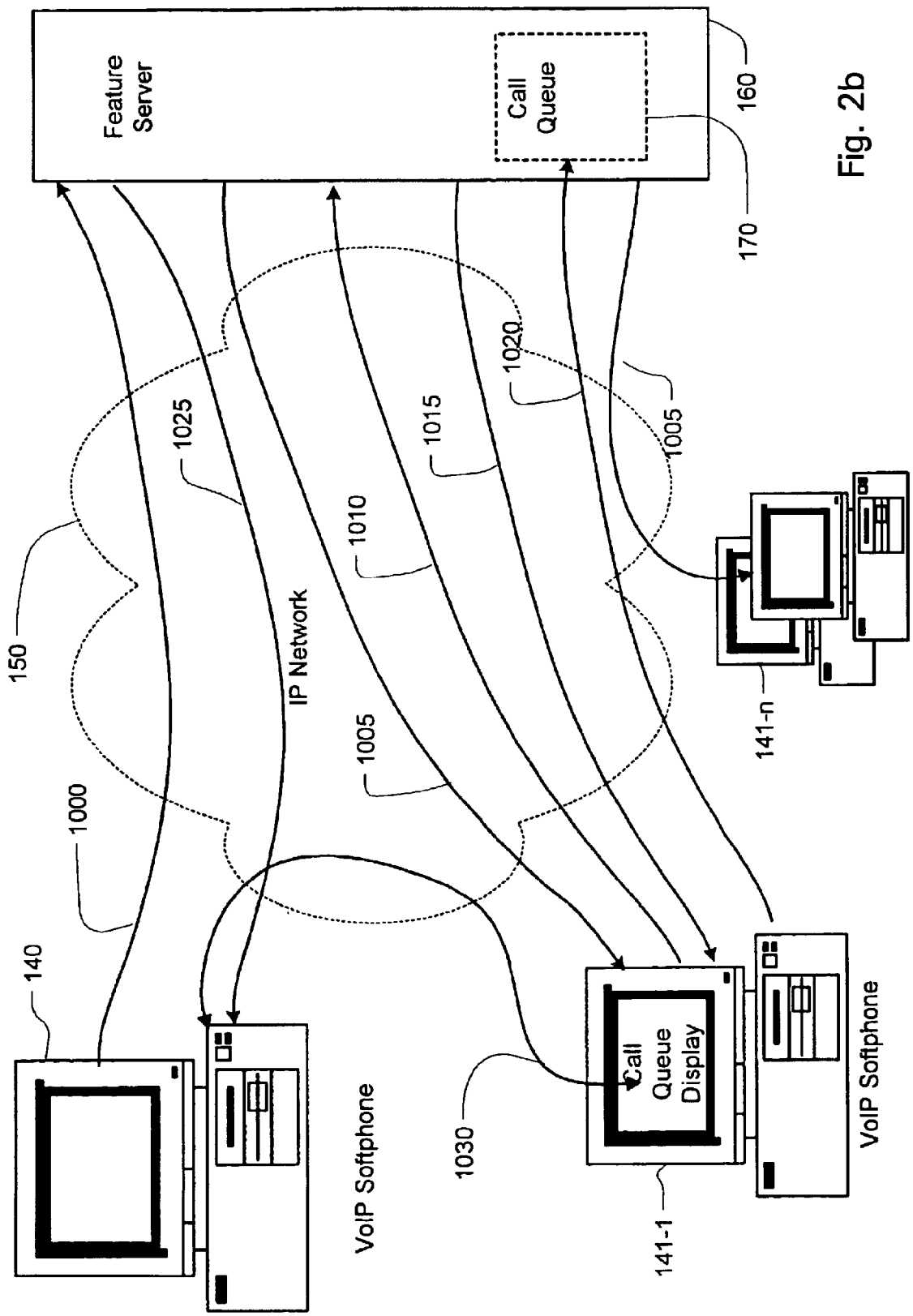

| Time-Date of Call | Caller-ID Name-Number | Return Caller | Queue Position | IGF Status | Time in Queue | Called Party or DN | Purpose of Call | Urgent or Priority |
|---|---|---|---|---|---|---|---|---|
| 13:05:06 12-25-99 | Sidney 555-820-1994 | Y | 1 | Complete | 00:01:23 | (Main Number) | Cust. Service | P |
| 13:08:02 12-25-99 | Natasha 555-234-7654 | N | 3 | 00:03:02 | 00:03:23 | Buster | Unknown | |
| 13:06:00 12-25-99 | Fred 555-743-8254 | N | 2 | Complete | 00:01:03 | Kyle | Order Entry | |
| | | | | | | | | |

Fig. 4a Call Queue Screen

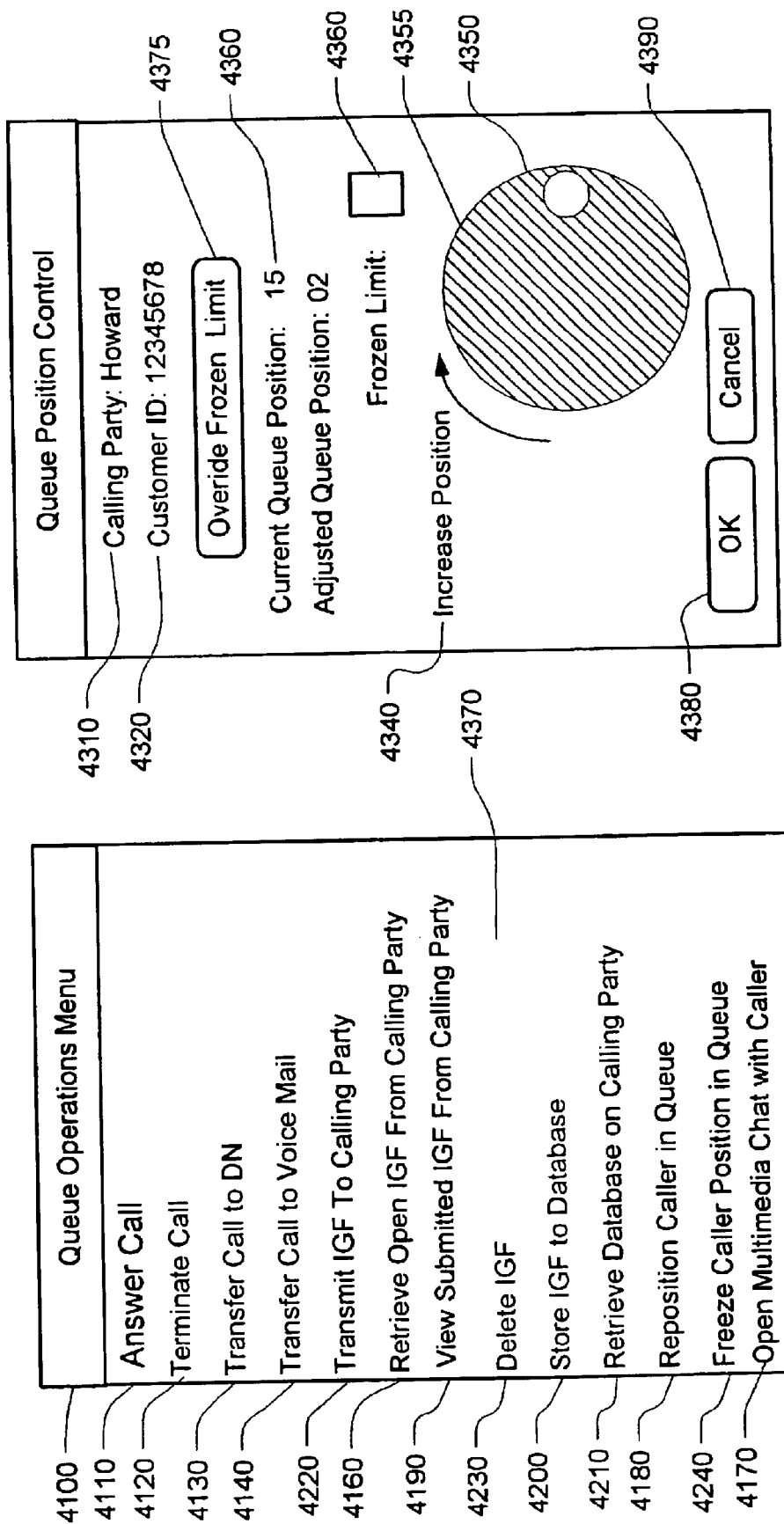

CALL CENTER QUEUE ADMINISTRATION

RELATED APPLICATIONS

This application incorporates by reference the disclosure of co-pending application Ser. No. 09/449,824 filed Nov. 26, 1999, entitled "User Identification Over Circuit And Packet Switched Networks", now abandoned. This application is related to application Ser. No. 09/511,257 filed of even date herewith entitled "Questionnaire Based Call Routing", now abandoned. This application is also related to application Ser. No. 09/511,258 filed of even date herewith entitled "Multimedia Call Routing in an IP Network".

FIELD OF THE INVENTION

This invention relates to communications systems and, more particularly to telephony conducted over packet networks.

BACKGROUND OF THE INVENTION

To provide telephonic communications between computer terminals connected to a packet network, "voice over IP" (VoIP) software called "softphone" software is employed that typically conforms to the protocols defined in Recommendation H.323 of the International Telecommunications Union (ITU) entitled "Visual Telephone Systems and Equipment for Local Area Networks which Provide a Non-guaranteed Quality of Service". The first above-identified copending application improves the reliability of calling party identification in VoIP applications by employing a feature server that obtains "caller-ID" information from the telephone company rather than relying on the information provided by the caller.

In a packet switched communications system which is intended to serve business customers it is important, not only to identify the caller, but also the reason that the call is being made. This is of special importance where a large number of calls may be simultaneously incoming to a called party who has operators or sales attendants standing by to field hundreds or thousands of calls in a day. To facilitate the handling of such calls it would be advantageous to obtain sufficient information from callers before any call is answered and to provide a display of the call queue with sufficient information to enable any of the call center attendants to determine which calls should be answered first, which calls are from repeat callers and to whom a call should be directed.

SUMMARY OF THE INVENTION

In accordance with the principles of the invention, a call center's attendant positions in a packet switched network are provided with a display of the queue of incoming calls in which each call's initial priority status is ascertained from an information gathering form ("IGF") completed by each caller prior to the call being answered. For example, the nature or purpose of the call is elicited by scanning the IGF returned by a caller which, having been indexed against the caller's directory number, indicates when a previous caller makes a repeat call. The "repeat caller" information is included in the display, together with caller-ID information. The IGF allows a caller to indicate the urgency of his call and this information is also included in the queue display to allow an operator to reposition the call within the queue of incoming calls or to divert the call to another directory number.

BRIEF DESCRIPTION OF THE DRAWINGS

The foregoing and other features of the invention may become more apparent from a reading of the ensuing description together with the drawing, in which:

FIG. 2b shows the message flow for the establishment of an IP voice path after call acceptance;

FIGS. 3c-1 and 3c-2 are flow charts showing the receipt of the IGF at the feature server;

FIG. 4a shows the call queue screen;

FIG. 4b shows the menu display available to the called subscriber;

FIG. 4c shows the screen for changing a call's queue position;

FIG. 7-1 is a flow chart for the new call handling routine;

FIG. 7-2 is a flow chart for the priority call handling routine;

FIG. 7-3 is a flow chart for the urgent call handling routine;

FIG. 7-4 is a flow chart for reconnect from working off-line routine;

FIG. 7-5 is a flow chart for the call me back routine; and

FIG. 7-6 is a flow chart for the call queue for a according a minimum priority to a call.

DESCRIPTION

Figure 1:
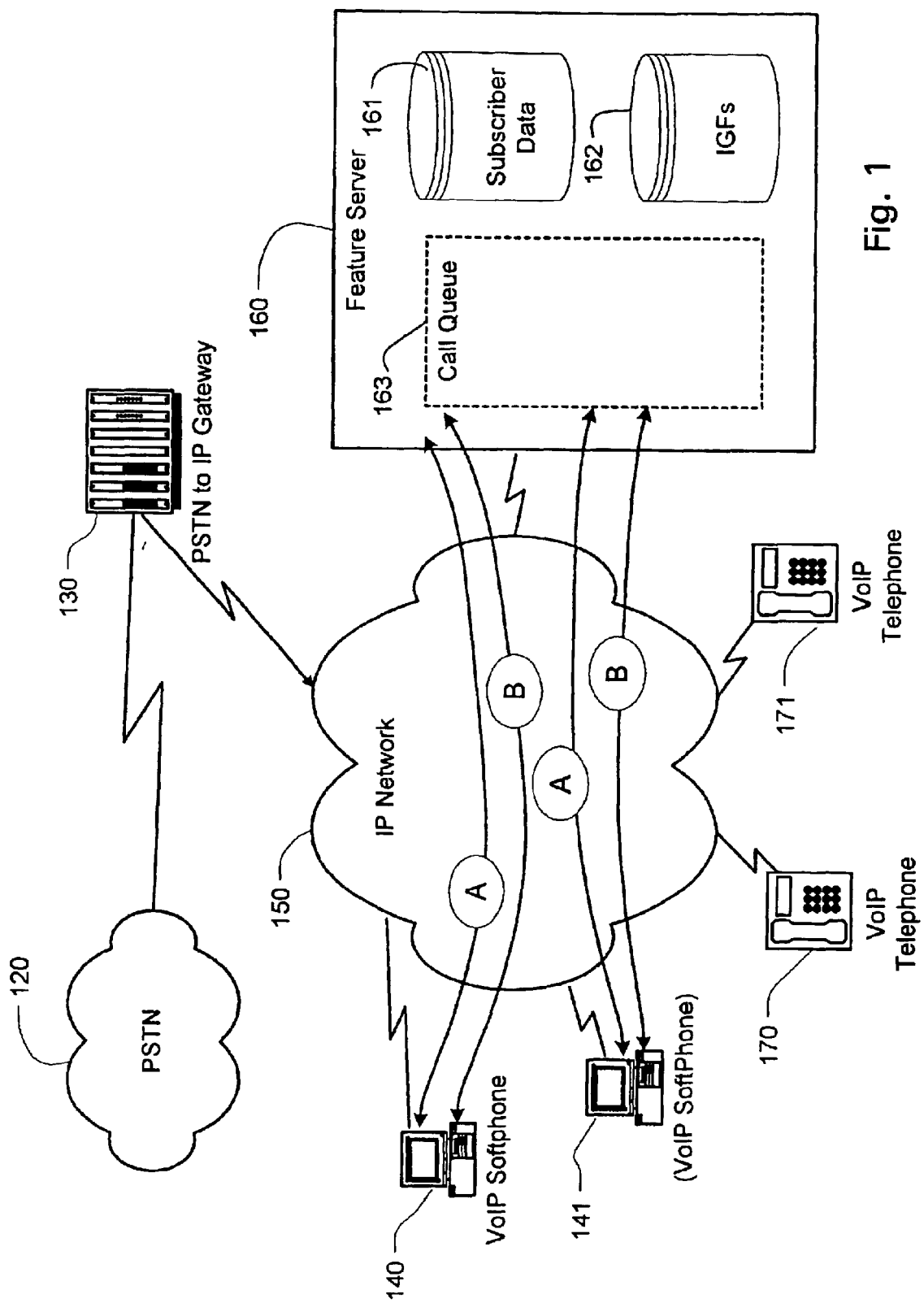
FIG. 1 shows an overview of the invention.

FIG. 1 shows a packet switched IP network 150 and a feature server 160 which may advantageously employ the functionality of the feature server disclosed in the aforementioned co-pending application. IP network 150 may include the well-known Internet or be a private, i.e., managed access, packet network. Access between IP network 150 and the public switched telephone network (PSTN) 120 may be effected via a conventional PSTN to IP gateway 130. Communications connections among computer terminals 140, 141 and VoIP telephones 170, 171 and connections between them and gateway 130 is regulated by feature server 160 which performs gatekeeper functions.

In prior art VoIP telephony, a call from one subscriber to another would begin with the calling terminal sending a limited bandwidth call control message called an admission request signal (ARQ) to the system gatekeeper. The gatekeeper would either accept or reject the call. If the ARQ is accepted, the gatekeeper confirms its acceptance by returning an Admissions Confirm (ACF) call control message, followed by the gatekeeper providing the calling terminal with the called terminal's IP address. This is sufficient for the network to establish an end-to-end connection between the calling and called terminals over which the bandwidth is limited only by the capacity of the network.

In accordance with an aspect of our invention the feature server employs a mixture of different protocol messages having different bandwidth capabilities before an end-to-end connection is established between the caller and the called party. In FIG. 1 the paths through IP network 150 labeled "A" may advantageously carry the bandlimited H.323 protocol messages used to effect VoIP service. Paths labeled "B" carry messages that are beyond the capabilities of the current version of the H.323 protocol and will be referred-to hereafter as out-of-band (OOB) messages. Among other things, the OOB messages carry the bandwidth intense multimedia enabled IGFs created by subscribers and which are stored in feature server 160 to be sent to a calling party even before the call is answered. Later, when a calling party completes the IGF, it is sent in an OOB message to an operator and may be viewed before the operator is required to answer the call.

Figure 2A:
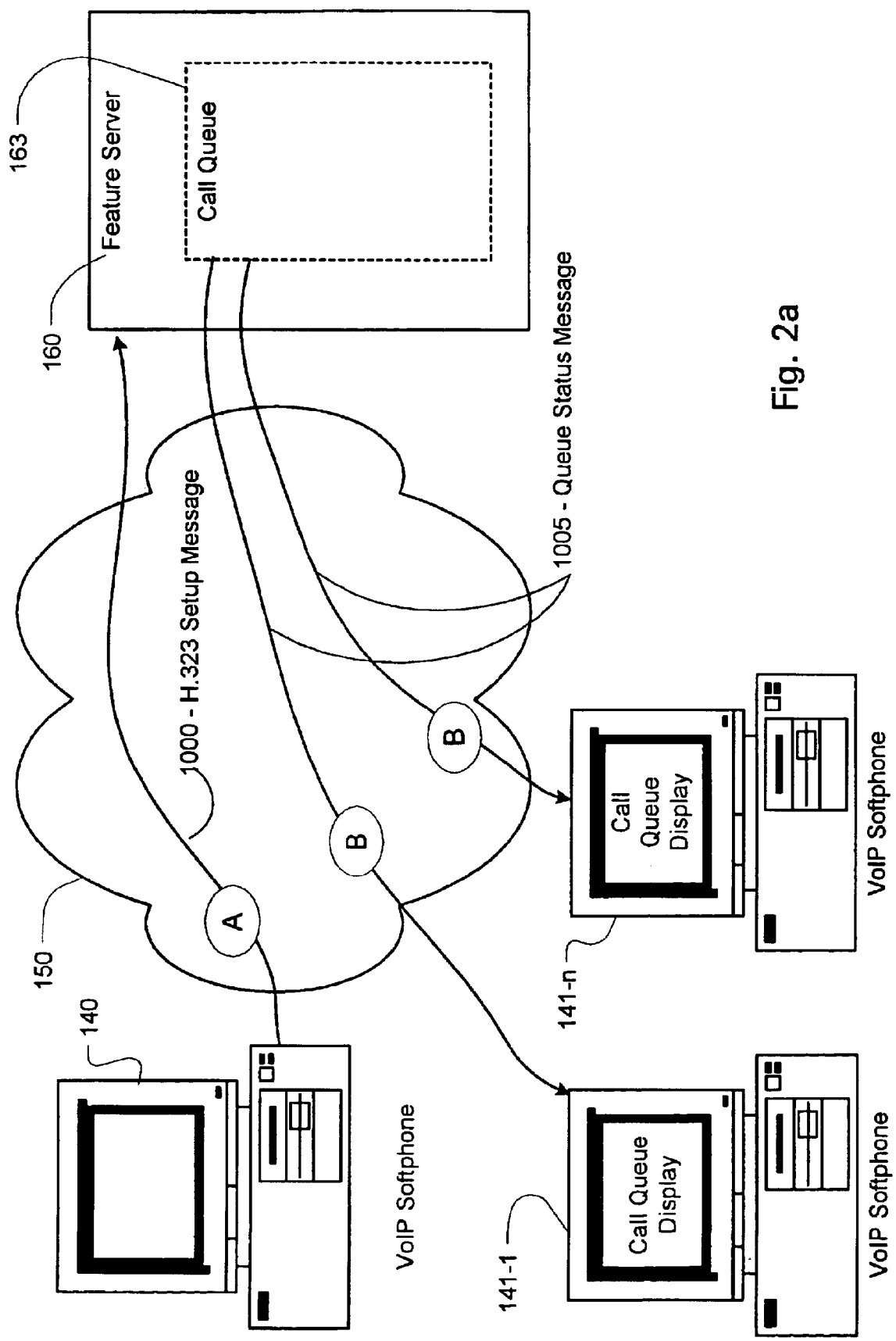
FIG. 2a shows the message flow for notifying a group of terminals of an incoming call.

FIG. 2*a* shows the paths employed when a calling party at terminal 140 calls a subscriber, assumed to be a business customer, who has a plurality of operator terminals 141-1 through 141-*n*. In the prior art method of setting up a VoIP call, an H.323 call setup message is transmitted from the calling terminal to a directory server (not shown) which returns the called terminal's IP address so that a direct, end-to-end channel can be established between the calling and called terminals. In accordance with the principles of the present embodiment, the call setup message, 1000, is received by feature server 160 which does not immediately return the called terminal's IP address to the calling terminal. Instead, feature server 160 receives all call setup messages and determines when, and if, an end-to-end channel is to be set up, or whether some other connection would be more appropriate.

In response to call setup message 1000, feature server 160 sends an OOB "queue status message" 1005 to all of the called subscriber's operator terminals 141-1 through 141-*n*. The queue status message causes the Call Queue Screen, FIG. 4*a*, the Queue Operation Menu, FIG. 4*b*, and the Queue Position Control screen, FIG. 4*c*, to appear at each of terminals 141-1 through 141-*n*. The operator at terminal 141-1, for example, may select one of the calls in the Call Queue screen by using a mouse to direct the cursor to the row in which the particular call is displayed and then "click" the mouse button. The operator may then select one of the "radio" keys in the Queue Operations Menu, FIG. 4*b* to control the disposition of the call.

If an operator at terminal 141-1 selects radio key 4110 in FIG. 4*b*, terminal 141-1 transmits an "answer call" OOB message 1010 (FIG. 2*b*) to feature server 160. Feature server 160 responds by transmitting to terminal 141-1 an H.323 "call setup" message 1015 which contains the IP address of the caller's softphone terminal 140. Terminal 141-1 responds to call setup message 1015 by returning an H.323 "accept call" message 1020 to feature server 160 which contains the IP address of terminal 141-1. Feature server responds by sending an exact copy 1025 of H.323 "accept call" message 1020 to terminal 140. Since terminal 140 now has the IP address of what it believes to be the "called party", terminal 140 sets up a direct two-way voice path 1030 in IP network 150 to terminal 141 as if this were a prior art VoIP call.

Figure 2C:
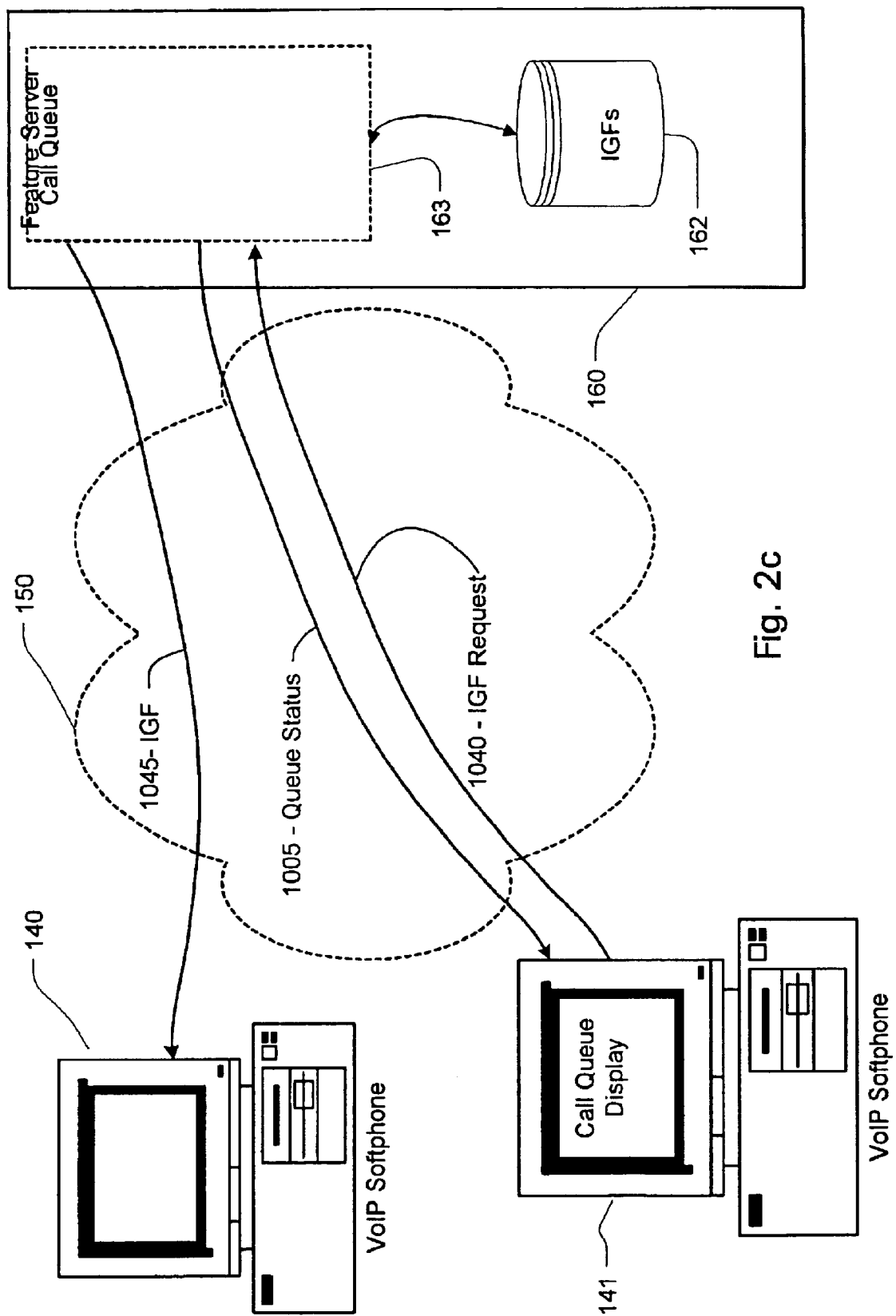
FIG. 2c shows the message flow for an "Issue IGF" message by a called subscriber.

FIG. 2*c* assumes a different sequence of events. Instead of answering the call, the operator at terminal 141-1 responds to information in the Call Queue Display (FIG. 4*a*) by selecting radio button 4220 in Queue Operations Menu 4100, FIG. 4*b*. This causes terminal 141 to send an OOB "IGF request" message 1040 to feature server 160. Feature server 160 responds by accessing its database 162 where information pertinent to the subscriber using terminals 141-1 through 141-*n* is stored. The accessed IGF questionnaire is assumed to have been previously prepared by the subscriber (or by the subscriber's service provider) and stored in data base 162. Feature server 163 transmits the IGF as OOB message 1045-IGF to calling terminal 140.

Figure 2D:
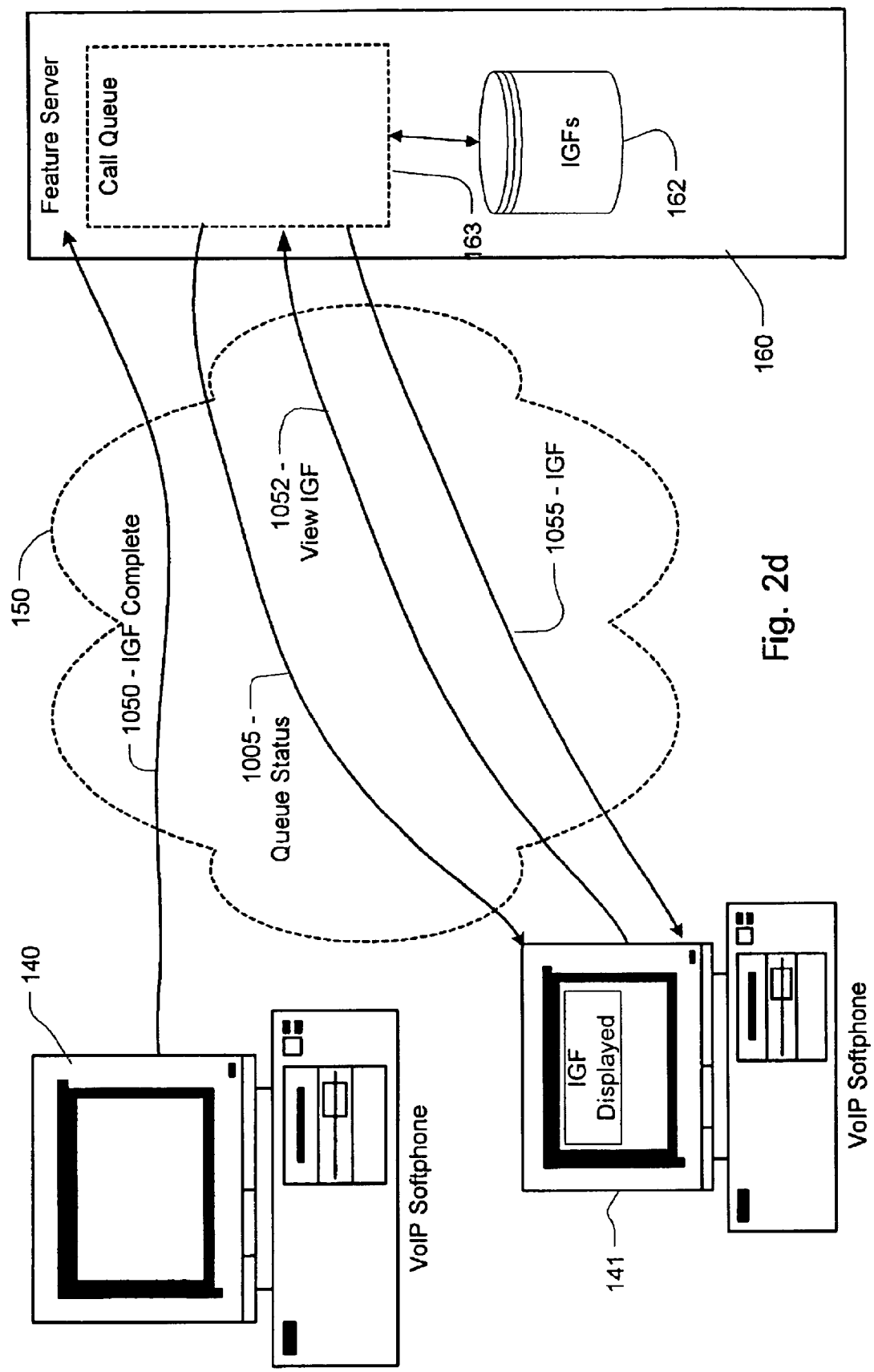
FIG. 2d shows the message flow for calling party's return of an IGF.

FIG. 2*d* shows the user at terminal 140 sending the completed questionnaire as an OOB "completed IGF" message 1050 to feature server 160. Feature server responds to the receipt of the completed IGF message by forwarding it to terminal 141 as an OOB "completed IGF" message 1055.

Figure 3A:
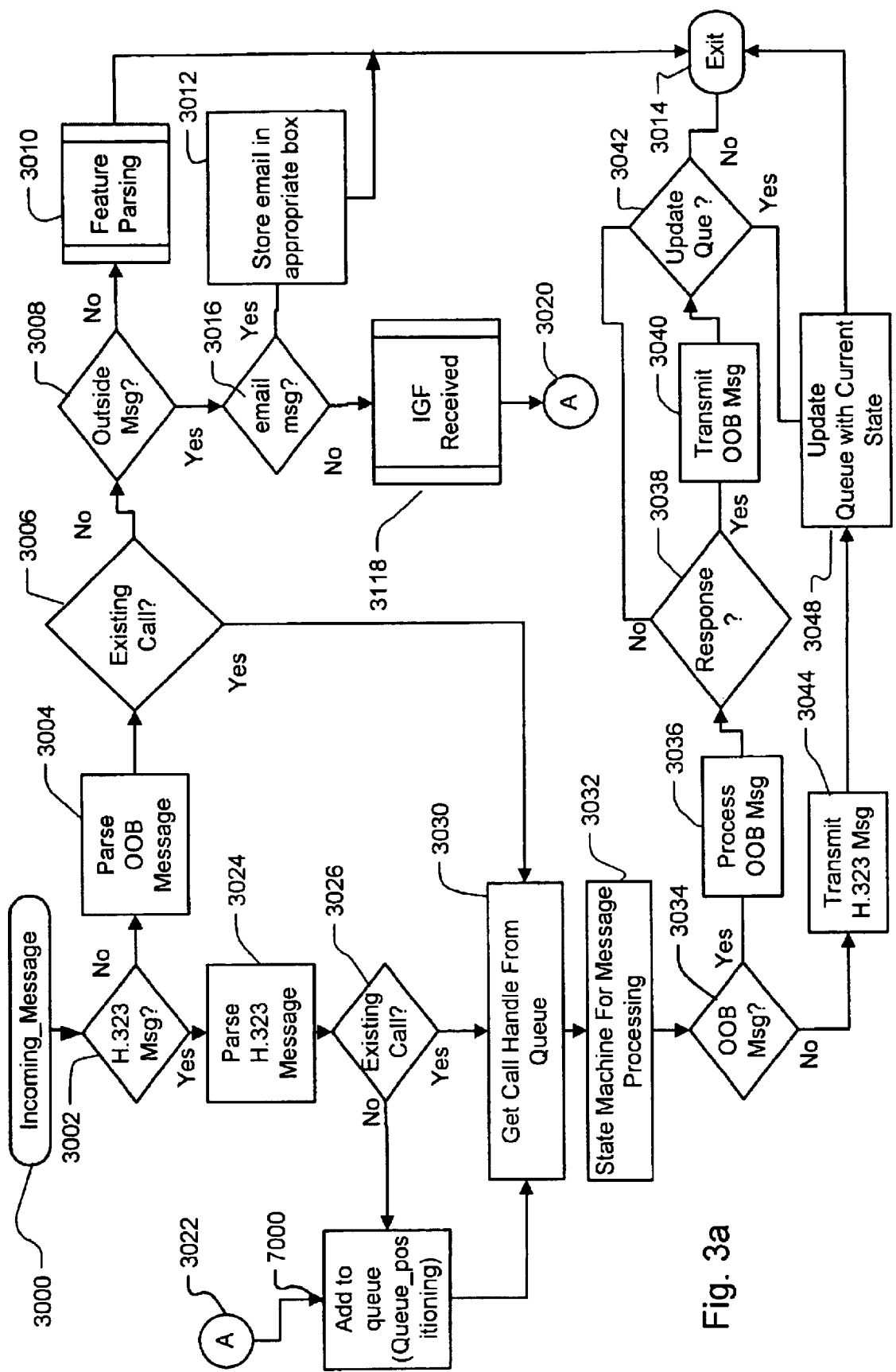
FIG. 3a is a flow chart of the main call processing performed by the feature server.

To better understand how the feature server accomplishes the above-described functions, reference will now be made to FIG. 3*a* which is an overview of the call processing performed by the feature server. At 3002 the feature server determines the nature of the message it receives. If the message is an H.323 message the flow moves to step 3024 where the message is parsed and at 3026 a determination is made as to whether the message pertains to an existing call (i.e. there is a call reference to the message in the queue) or is a new call such as an H.323 setup message. If the message pertains to a new call, the flow moves to Add to Queue 7000 (which is the queue positioning routine explained in FIG. 7.) Briefly, upon insertion of a call in the call queue a unique call reference value (i.e. a call handle, e.g., "Caller=12345") is created which uniquely identifies the call within the queue. All references to calls in the queue are based on this handle.

After the call handle is assigned, the flow continues to step 3030 where the unique value is assigned to a variable that is then input to the state machine for message processing, 3032. In 3032, the state machine determines what action should be taken for any particular message. Since this system uses both H.323 messages and OOB messages which may be intermixed, the state machine determines in regards to the call processing message flows the next message to be transmitted and to whom it is to be transmitted. For example, when an H.323 setup message arrives at the feature server, the call is placed in a queue and no further messages are generated until the call is taken by an operator. It is only after the feature server receives an OOB message from the operator that the H.323 message is forwarded to that operator. After the state machine determines the next message to be processed, step 3034 determines if it is an OOB message such as "Send_IGF" to the calling party. If it is, the OOB message is processed. If the operator is to be informed of the action taken, for example, an update to the queue display based on the action just taken, that is determined in 3038. The queue display would indicate that an IGF had been transmitted to the caller. The transmission of the IGF to the caller is performed at 3040. If further updates need to occur on the queue showing the completion of the processing of the OOB or H.323 message, it would be so updated at 3048. The routine then exits at 3014.

If an H.323 message rather than an OOB message is detected in 3034, the appropriate H.323 message is transmitted at 3044. As with the OOB messages, the queue would be updated appropriately in 3048 and the routine would exit in 3014.

Returning to the test for existing call in 3026, if the call is an existing call, the call handle would be identified in 3030 and the previously described steps of flowing through the state machine processing would occur.

If step 3002 determines that the incoming message is an OOB message, for example, an http command from the operator or the submittal of a complete IGF from a caller, the OOB message would be parsed in 3004. If the message pertains to an existing call, the logic flows to "Get Call Handle from Queue" in 3030. The flow from this point would continue as was previously described. An example of such a message (hereinafter to be more fully described) would be the reciept of an "Answer Call" message such as: http://my_feature_server/queue.asp?Command=Answer_call.

If the message was received from the "Outside" as shown in 3008, the message will likely be the submittal of an IGF, a reconnect, or a request to work "Offline". It could also be the receipt of an email from the calling party. At this point, the message is first parsed to see if it is an email in 3016. If it is, the email is simply directed to the appropriate mail box in 3012 and the routine exits at 3014. If it is not an email, it is assumed to be an IGF message (or a complete IGF form). This is message is parsed in IGF_Received and is described in FIG. 3-1. This routine will attempt to prioritize as well as automatically direct the call for the call queue. Various parameters for the call queue are set within this routine. On return from this routine, the logic branches from 3020 to the on-page connector at 3022 where the logic resumes at 3028 which is Add to Queue (Queue_positioning). This routine will be described in FIG. 7. The logic opens the unique call handle in 3030 and flows to the state machine 3032 and subsequent previously explained steps. In 3020 Feature Parsing and processing occurs for non-call related functions. An example of this would be the request of a customer database record for a non-active call (i.e. a call not in the call queue). An example would be an http message to the feature server for a customer record look-up for a "Call-Me-Back" request. Such processing is well understood and is not explained here. The program would exit at 3014 after such processing took place.

Figure 3B:
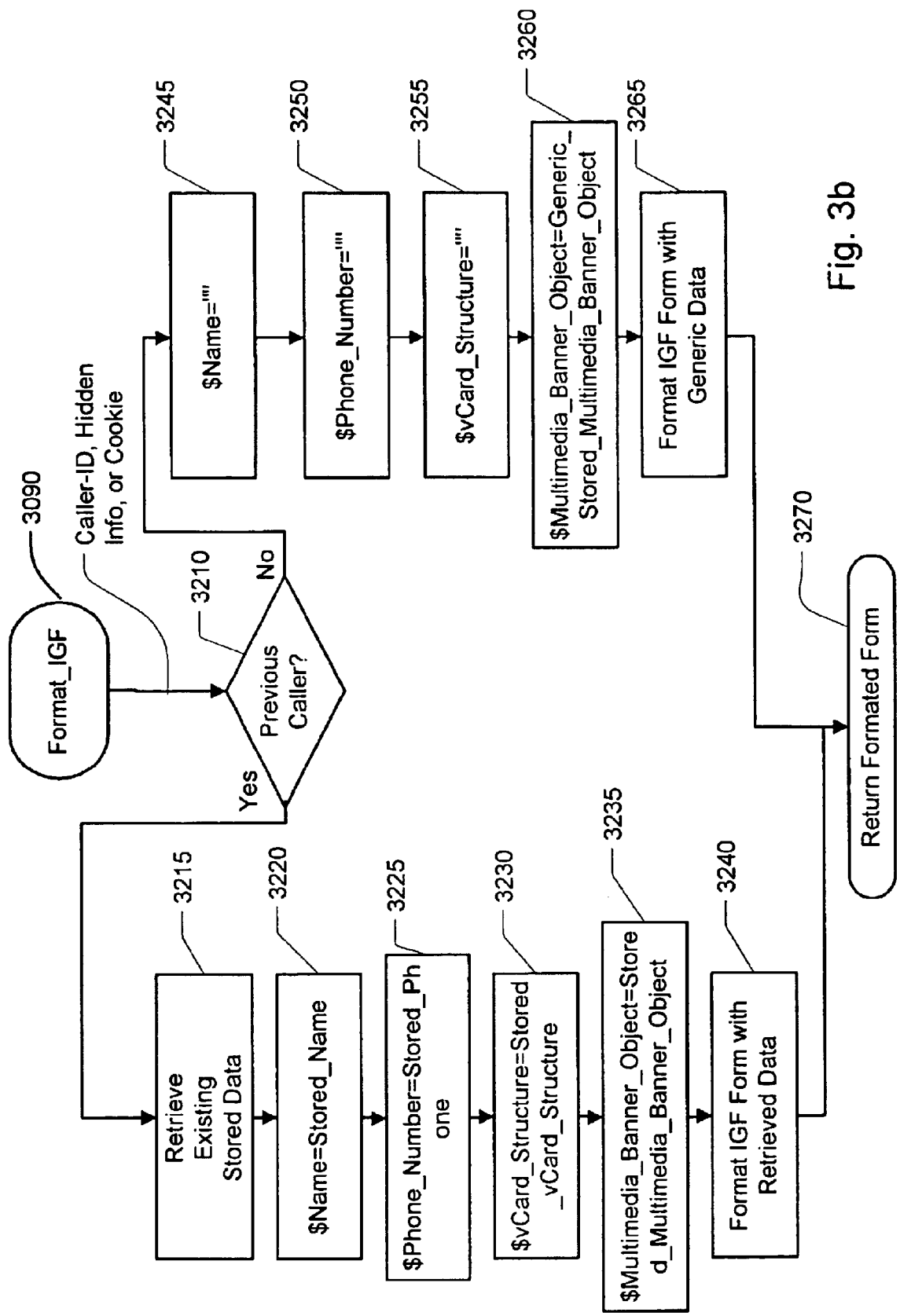
FIG. 3b is a flow chart for formatting of the IGF.

Referring now to FIG. 3b the steps for formatting the IGF are shown. At step 3210 a check is made to determine if the IGF relates to a previous call. At steps 3215 through 3235 stored information pertaining to the caller who had previously called the subscriber is retrieved from memory and entered into local variables to be formatted in step 3240 for insertion into appropriate fields of the IGF to be displayed to the caller. It should be further noted here that the variable names referenced are the variable names, which are user defined in the creation of the IGF. The use of these variables is discussed in the creation of the IFG as is depicted in 5b. As an example to clarify this, in 3220 the stored name of the caller is assigned to the variable$Name. This same variable appears in 5020 of FIG. 5b. Normally, this information would be manually entered from a keyboard by the calling party. In this case, the calling party has been identified and their name as it appears on their internally stored record would be substituted in this field. The location of the display of this information has been previously defined in the IGF creation. Thus, when the form is transmitted to the calling party, the known fields are already filled in. The other variables shown in 3225, 3230, and 3235 also have corresponding entries in FIG. 5b 5020 and 5030. If the IGF is to be formatted for a caller who had not before called the subscriber, the local variables for name 3245, phone number 3250, vCard structure 3255, multimedia banner object 3260 are assigned null values. Thus, these fields are blank when displayed to the calling party. The calling party could then fill in the fields appropriately. If the caller was a previous caller, the IGF would be formatted with this known data in 3240. If it was not a previous caller, the IGF would be formatted with the null data in 3265. The formatted form is returned to the invoking routine in 3270.

Figures 1, 3C:
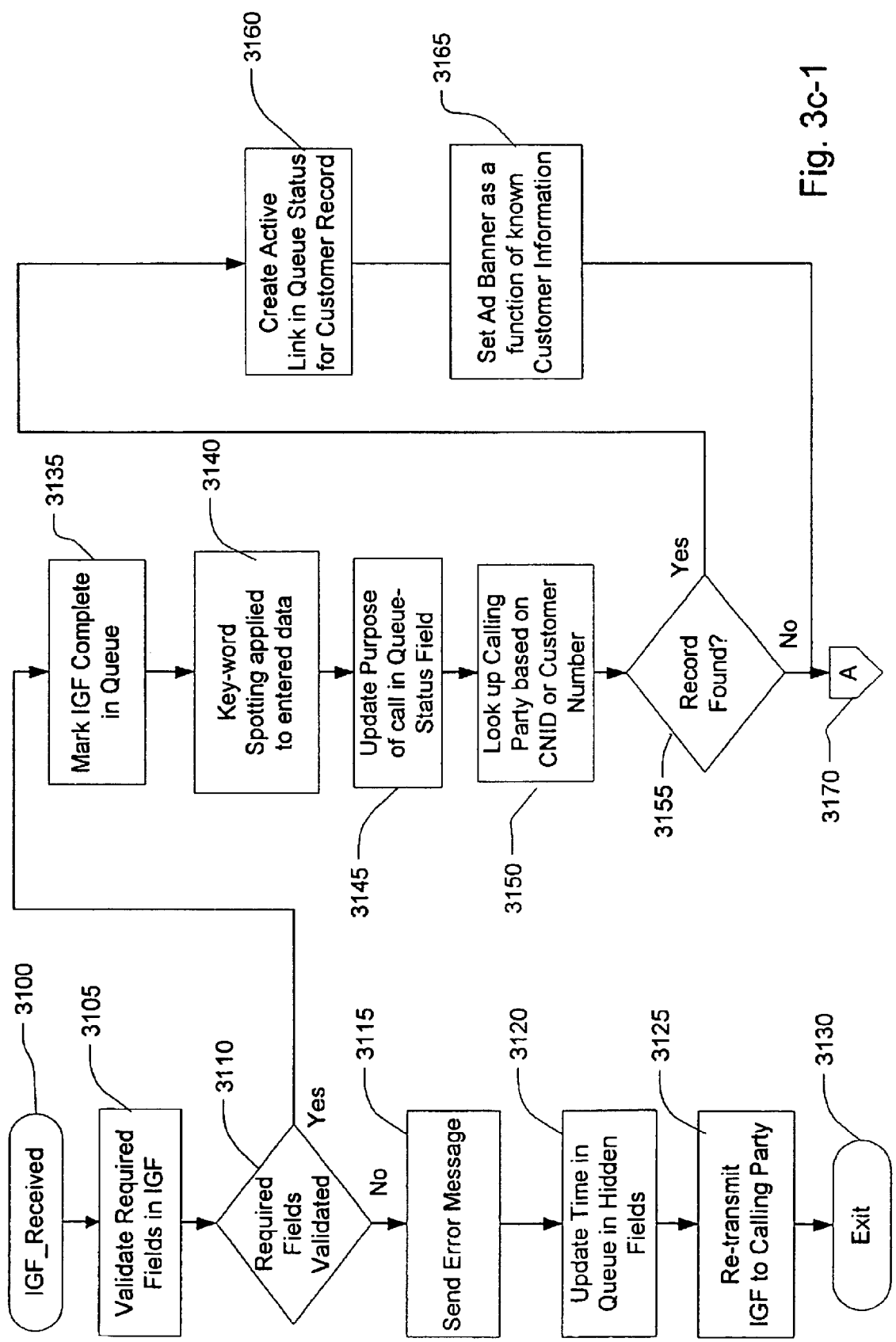

FIG. 3c-1, beginning at step 3100, shows the routine executed upon the receipt of an IGF_RECEIVED. At 3105, the information received from the caller's IGF is compared with a template to see that it contains all of the required fields, for example, whether the caller's Name and Phone Number or email address have been inserted. At step 3110, a test is performed to see if information has been entered into the required fields. If they have not, the step 3115 caused an error message to be formulated to indicate to the caller which indicates which required fields are incomplete. At step 3120 the current time and the caller's current queue position are stored in a field of the IGF that will not be visible to the caller. At step 3125 the error message is transmitted to the caller and the IFG processing routine exits at 3130, but the caller's call remains in the queue.

If the required fields were all validated at step 3110, the calling party's entry in the call queue is marked as IGF_COMPLETE in 3135. At step 3140, the completed IGF is scanned for the appearance of key words to determine the reason for the call. For example, such pre-arranged key words as Order, "Customer Service", Emergency, etc. can be parsed from the text entered by the caller. At step 3145, if key words are found, they are entered into the queue status fields (FIG. 4a). At step 3150 the caller-ID information from the original call setup message is used to determine whether the caller has a record in the data base. For example, whether the caller is a customer and the status of the customer's account would be useful information for the operator to see in order to properly route the call. If a record is found at step 3155, an active hyperlink to that record is created and added to the queue status field at step 3160. When the called subscriber's operator "double clicks" on the active hyperlink in the queue status field the information from the record appears in a pop-up display. The information is transmitted from the server to the operator using well-known web techniques such as hypertext transfer protocol (http). Secure transfers can be used for sensitive applications such as e-commerce. At step 3165, an advertisement (such as an "ad-banner") can selected for display to the caller based on the record information associated with the calling party. For example, if the call is an e-commerce order, the ad-banner can be set to display information about an "on-sale" item or a new product or service offered by the called subscriber.

Figures 2, 3C:
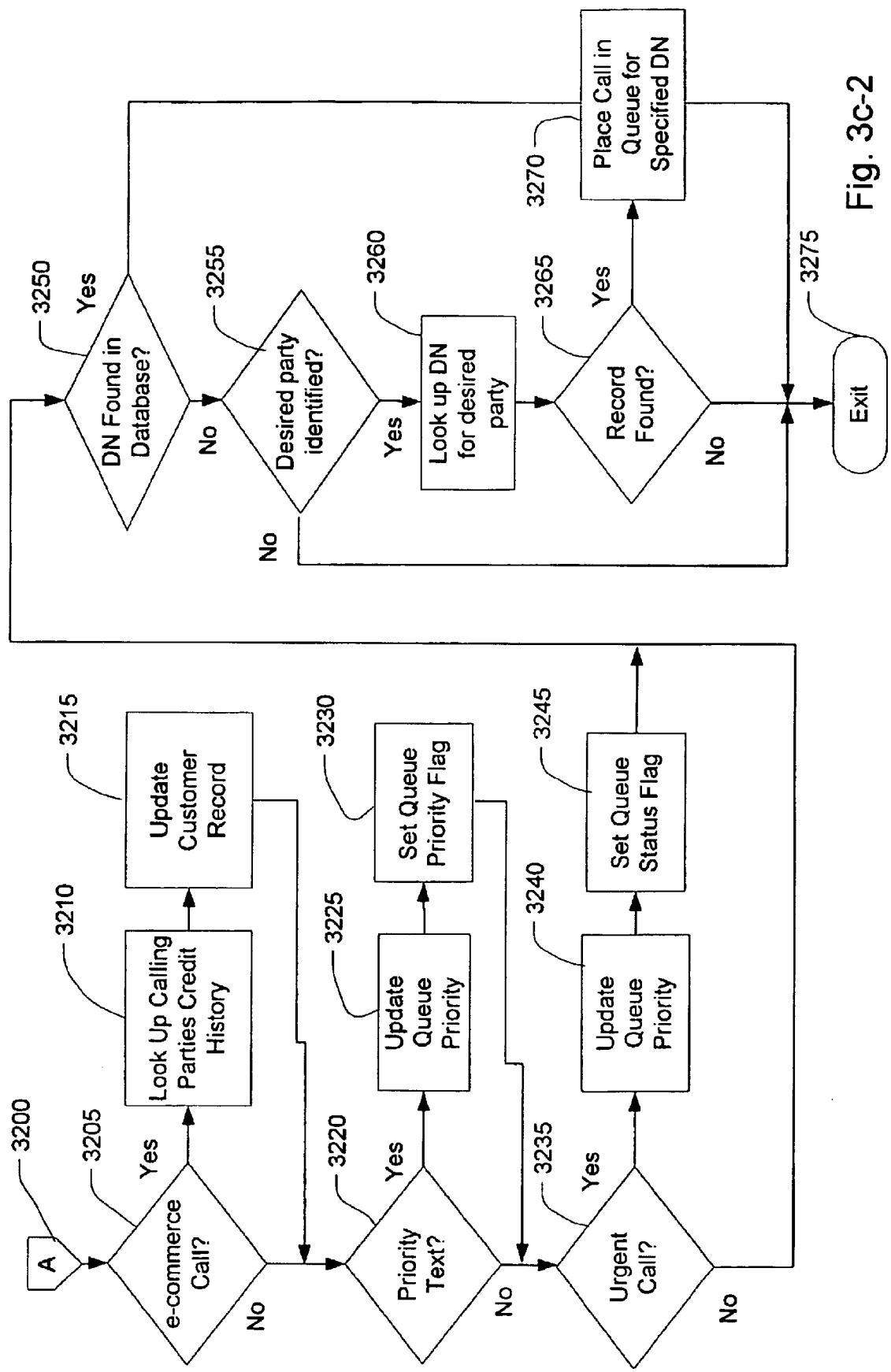

The call flow continues in FIG. 3c-2 at 3200. If the call is an e-commerce call as determined in 3205, the calling party's credit history is looked-up in a database in 3210. This may be a local database lookup or may be a search to an external credit organization—such as in the case as when the calling party has entered a credit card number. The response to this query is inserted into the calling party's record in 3215. The call flow then proceeds to step 3220 to determine whether the caller's IGF contained any critical keywords such as "Place Order" or "Customer Service". If so, processing proceeds to step 3225 where the call may be repositioned in the queue in accordance with the procedure shown in FIG. 3c-3, to be described hereinafter. Processing continues at 3230 where a queue priority flag is set in the status field column 4080 (FIG. 4a) for the call. In call center, for example, the priority flag can indicate the nature of the priority, e.g., for customer service, callback, etc. At step 3235 the Urgent Call box 5080 (FIG. 5) of the IGF is read. If checked, it means that the caller wished to indicate that the call is urgent. Of course, in actual practice, the box could be checked by anyone. An optional system parameter (not shown) in the caller's stored record could be set so that the "urgent call" box of a particularly troublesome caller's IGF would be ignored. At step 3240 if the urgent call box has been checked, the call is elevated in the queue. The Queue_Status_Field_Flag is set at step 3245 to cause the call to be shown as an Urgent Call in the Call Status column 4080 in FIG. 4a. At step 3250, a test is performed to see if a specific DN at the called subscriber's DN was specified in the IGF. If it was, the logic flows to 3270 where the call will remain in queue but will be marked for specific person at the called subscriber's premises and the routine is exited at 3275.

If a specific person's DN was not found at step 3250, the text entered into the IGF will be scanned at step 3255 to see if a specific name such as "Sidney" or the word "Marketing" or "Sales" appears. If such a name is found, processing proceeds to step 3260 where an attempt would be made to look up a DN associated with the detected word text. If a corresponding DN is found, the call remains in queue, is marked to indicate the appropriate called party at step 3270 and the routine exits at 3275. If a DN or called party were not found, the call remains in queue for the next available operator to answer.

The Call Queue Screen FIG. 4a, includes a number of useful fields. The time and date of the incoming call is shown at 4000 while caller-ID information provided by an H.233 message is shown at 4010. The current position of a call in the incoming queue in relation to other calls is shown at 4030. At 4020 an indication appears to inform the operator that the caller is a return caller. The return caller indication results from the caller selecting the "reconnect" option 5120 (FIG. 5c) in the IGF. The status of of the IGF for each call at 4040 indicates the time elapsing since the IGF was sent to the caller and whether the IGF has been completed by the caller. If an individual was specified in the IGF, the corresponding name or DN extension is indicated at 4060. If the named extension is busy, the call is automatically placed in a queue for the specified DN. The purpose of the call (indicated in the IGF) is displayed at 4070. Finally, the "time-in-queue" is displayed at 4050. Advantageously, this time may be stored in a hidden field of the IGF which is read when the caller returns on a repeat call so that the call may be advanced in the call queue. For example, a person who waits 15 minutes for assistance and then "hangs up" will be advanced by 15 minutes in the call queue on their next call. Once the call is accepted, the time in queue counter is cleared.

As mentioned above, the operator takes action by selecting an entry in the Call Queue Screen, FIG. 4a and selecting one of the radio buttons in the Queue Operations Menu, FIG. 4b. For example, upon selecting "Answer Call", 4110 the following http message is transmitted:
http://my_feature_server/queue.asp?Command=Answer_call.
In this message, the field my_feature_server indicates the symbolic IP address of the feature server; queue.asp indicates the active server page; and the command is "Answer_call". The call is marked in the queue as belonging to the aforementioned operator and the H.323 "new call" message is sent to the operator. The softphone software at the operator's terminal responds with an H.323 "accept call" message which contains the terminal's IP address. The feature server transmits the same H.323 "accept call" message to the calling party. The feature server then transmits, via HTTP, an updated queue display to the operator which shows the calling party connected to the operator. Voice connection is completed via standard H.323 communications.

Other menu options include "Terminate Call" 4120 which, when selected, transmits the message:
http://my_feature_server/queue.asp?Command=Terminate_call&Caller=12345 If a call is terminated, options in the software (not shown) automatically delete any IGF which was not explicitly stored.

If "Transfer Call to DN" 4130 is selected, the following message is transmitted:
http://my_feature_server/queue.asp?Command=Transfer&Caller=12345&Called="555555-5555"
In this case, the command is "Transfer" and the call handle "Caller=12345" refers to the caller selected in the call queue and the party to whom the call is transferred is identified as: 555-555-5555.

The menu option "Transfer Call to Voice Mail" 4140 is an example of a call transfer in which a message, such as the following, would be transmitted from the operator's terminal to the feature server:
http://my_feature_server/queue.asp?Command=Transfer&Caller=12345&Called=Voice mail_box.
In the above example, the feature server would translate the literal Voicemail_box to the voicemail box telephone number, e.g., an IP address where the VoIP encoded voice may be stored using conventional techniques.

"Reposition Caller in Queue" 4180 is an important feature of the illustrative embodiment. When "Reposition Caller in Queue" is selected, a graphical user interface (GUI) "dialog box" pops-up as screen 4300, illustrated in FIG. 4c. Screen 4300 allows the operator to position the mouse cursor over the graphical "jog-wheel" 4350 and rotate it either clockwise or counter-clockwise. Rotating wheel 4350 clockwise elevates the call's queue position 4340. Rotating wheel 4350 counter-clockwise decreases the call's priority. Rotating the "jog-wheel" in either direction will result in an "Adjusted Queue Position" 4370 to be shown which will be the new queue position of the call if the operator chooses to select the "OK" button 4380. The operator may at any time "Cancel" the operation by depressing button 4390, in which case the current queue position is maintained. On pressing the "OK" button, a message of the following syntax would be transmitted to the feature server from the operator:
http://my_feature_server/queue.asp?Command=Reposition&Caller=12345&NewPos=3
Where my_feature_server is the symbolic IP address of the feature server on the network, queue.asp is the active service page program on the server, "?" delimits the parameters being passed, "Reposition" is the Command type. The caller is identified by the unique call identifier "12345", and the new position in the queue is defined by NewPos=3. In this example, the caller would be repositioned to the third queue position. The response from the feature server would be an updated queue display page to be displayed in the browser. This command results in the absolute positioning of the caller in the call queue.

Changes may have occurred in the queue between the time the queue position was selected and the time it was updated. However, the queue is prevented from making any changes during this period so that only one operator at a time can be acting on the queue. This locking time is minimal and should be transparent to the operator(s). The queue entries maintain the frozen queue position flag. However, this flag is only used by the pre-processing program as was the use of the jog-wheel in FIG. 4c. The "reposition" command does not refer to the frozen queue position flag. Handling the frozen flag outside the queue with pre-processing minimizes the time the queue is in update and is thus locked out against other operator interaction.

A unique feature of the illustrative embodiment is the ability to "freeze" a call in a particular call queue position so that a call will not inadvertently be put into a lower-priority call queue position. Thus, adjusting the queue in order to place a particular call higher up in the queue (i.e. by rotating the "jog-wheel" 4350 clock-wise) the next higher call position will not automatically be lowered, as indicated by "Frozen Entry Limit" 4355 displayed on the screen. When this happens, the "Adjusted Queue Position" will not advance any further. The operator may over-ride the frozen entry by depressing the "Override Frozen Limit" button 4375. After that operation, the queue may be advanced or reduced in priority for the specified caller for the duration of the GUI window. In actual practice, only certain operators may be given administrative permission to override the frozen entry limit.

An operator may manually transmit an IGF to the calling party by selecting menu item 4140 or retrieve a still-open IGF from a calling party by selecting 4160 in the event the caller has not completed the IGF. To manually transmit a particular IGG to the calling party, the following message is transmitted to the feature server:

http://my_feature_server/queue.asp?Command=Send_IGF&Caller=12345&IGF_type=3

In this example, IGF_type=3 indicates that the third type of IGF in an enumerated list would be transmitted. For example, this could be a form specific to customer service.

When an IGF is retrieved, the information is stored on the feature server and a copy of the IGF is displayable to the operator. If an operator answers a call and the calling party had already submitted in IGF to the system, the stored IFG can be viewed by selecting the "View Submitted IFG from Calling Party" 4190. If a caller's IGF has no information warranting that it be stored permanently in the feature server, the operator may select "Delete IGF" 4230. In this case, a "DELETE_IGF" message would be sent to the feature server and the IGF form would be deleted from the database. Likewise, if the operator has annotated the IGF with additional information, the operator may elect to store it by selecting the "Store IGF to Database" option 4200. If the calling party is a customer, there may exist a more detailed customer "file" which is stored separately from the described IGF and would be retrieved by use of the "Retrieve Database on Calling Party". This would be accomplished by transmitting a "Retrieve_database" message to the feature server. For example, in a web browser based system using active server pages, the message from the called subscriber or operator to the feature server would be formatted as:

http://my_feature_server/queue.asp?Command=Retrieve_database&Caller=12345

In this example, the HTTP transmission from the operator to the feature server starts by referencing the address of the feature server by name, "my_feature server" and the program "queue.asp" would be executed on the feature server. Arguments following the "?" include a keyword "Command=" followed by data for this command. In the example, the command is "Retrieve_database" and appended to that is a unique call reference value "Caller=12345" which indicates the particular caller of whom the data is being requested. The database for the caller is obtained by the program queue.asp looking up the caller corresponding to the handle "12345", retrieving that caller's database, formatting the data in a web page to return, and then transmitting that information via HTTP.

Figure 5A:
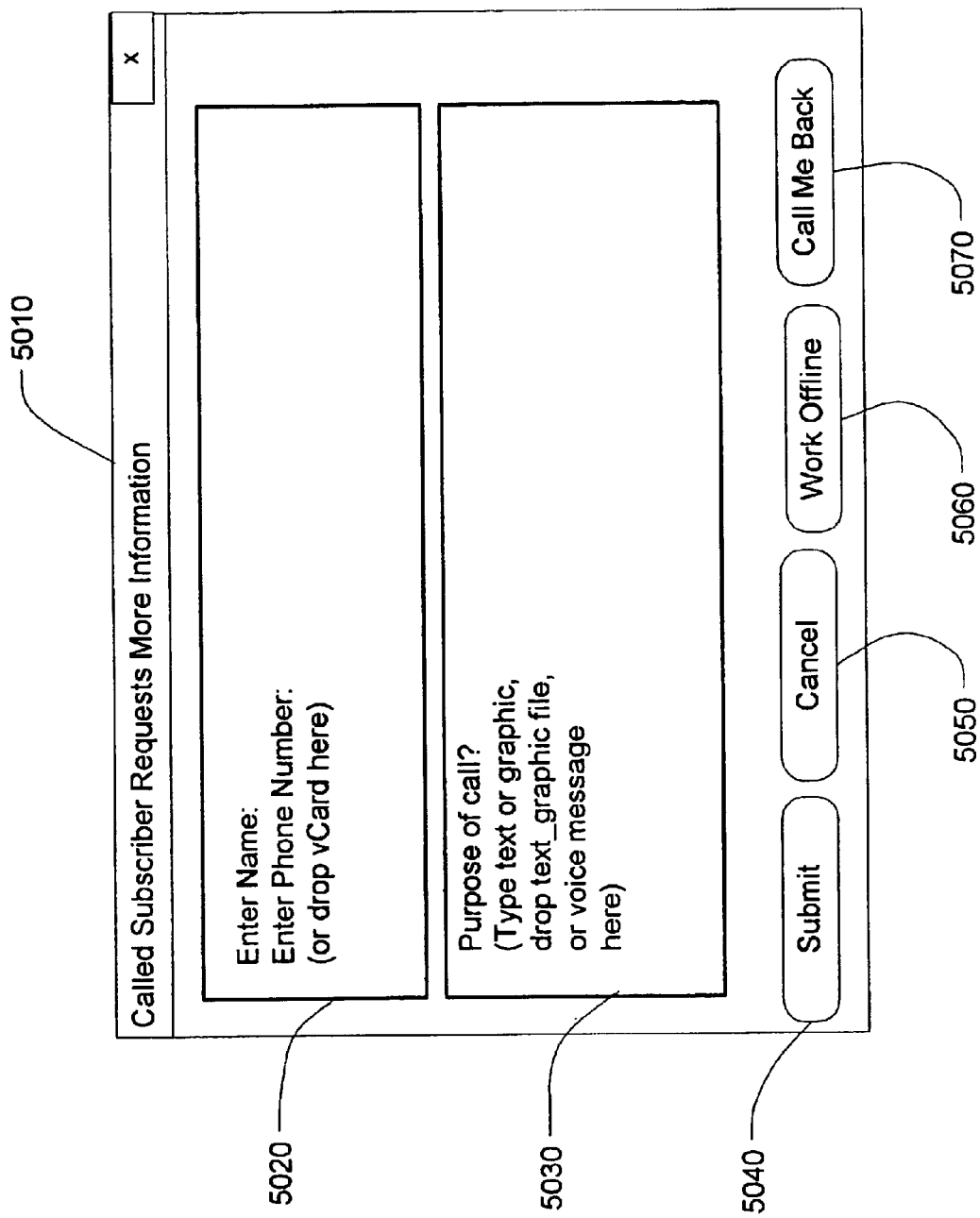
FIG. 5a shows the IGF displayed to a calling party.
Figure 5B:
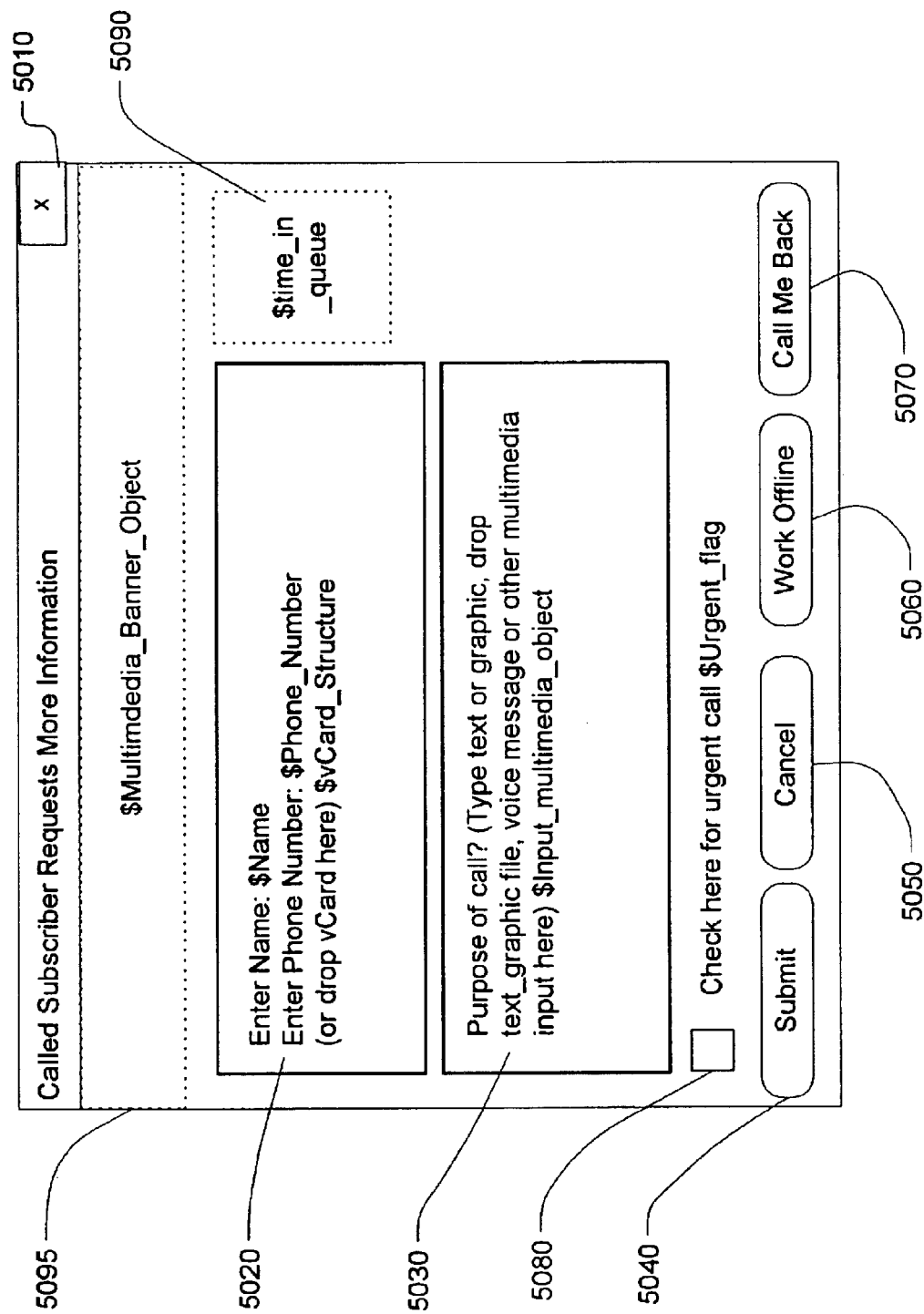
FIG. 5b is a flow chart for the construction of the IGF.
Figure 5C:
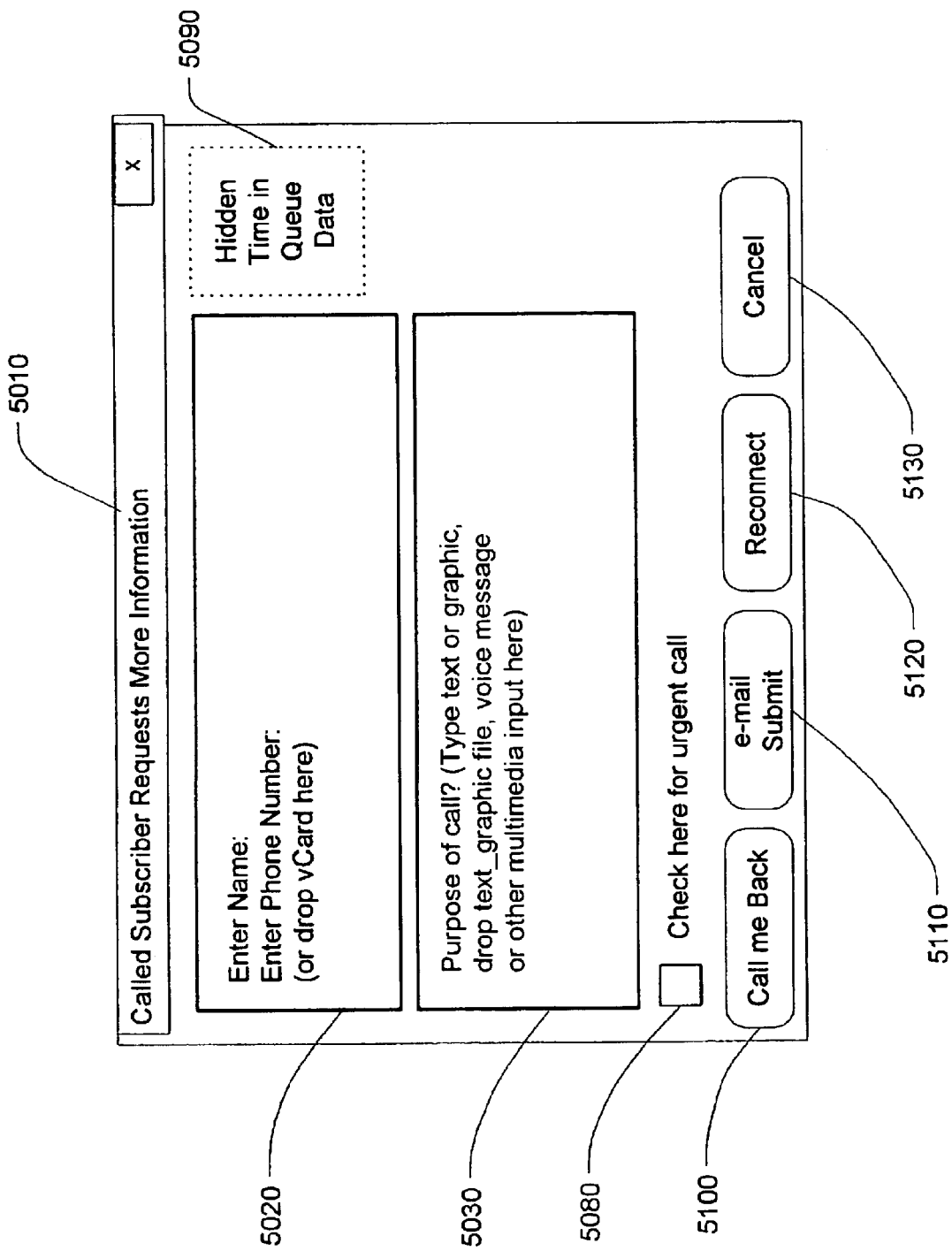
FIG. 5c shows the IGF displayed to a calling party working "off-line"

The IGF (FIGS. 5a–5c):

FIGS. 5a-5c show the IGF. The IGF displayed to the calling party will advantageously included a number of fields designed to elicit the information needed by the called subscriber. For example, window field 5020 is provided to enable the caller to insert his name and telephone number, illustratively by typing the information. Alternatively, this type of information, if previously compiled by the caller in "vCard" form, may simply be "dragged and dropped" into window field 5020 in a manner familiar to users of the "Windows" operating system. Window field 5030 is provided to enable the caller to type in the purpose of the call and, if desired, to drag and drop in a previously prepared text or graphic file that answers the request. At the bottom of the IGF appear four check-boxes to submit the completed form 5040; to cancel the form 5050; to work offline 5060, perhaps to gather the requested information; and to signal the called subscriber to return the call 5070, perhaps after waiting too long to have the call answered.

FIG. 5b shows the screen 5010 that permits a subscriber to construct a blank IGF that will elicit desired information from callers. Screen 5010 makes use of a number of pseudo variables (i.e., variables having a dollar sign prefix "$" to indicate fields which will be replaced with text or user input) which represent user-defined input fields that allow the subscriber to tailor an IGF to meet specific business needs. For example, $Phone_Number is a field which will allow the calling party to enter his phone number into the IGF so that the feature server queue program, FIGS. 6 and 7 may prioritize the incoming call. The field $vCard_Structure allows the calling party to "drag and drop" a vCard into an IGF window. Input field 5030 include the input variable $Input_multimedia_object which allows the calling party to either type text, draw graphics, or drop a multimedia file such as a voice message or video clip into a window of the IGF. The information would then be available to the feature server applications. $Multimedia_Banner Object 5095 allows the subscriber constructing the IGF to define a place holder for the feature server to transmit a multimedia banner such as an hypertext advertisement to the calling party. The Purpose of the call section 5030 is provided to permit the caller to enter text, draw a graphic or drop a multimedia files, such as a voice message into an IGF window specified by the input field $Input_multimedia_object. The check box 5080 allows the caller to set the user input flag $Urgent_flag in the IGF. When the IGF is parsed in the queue flow, FIG. 7-3, this flag will affect the position of the call in the call queue.

The $time_in_queue field 5090 is of special importance. This field is advantageously hidden from view in the IGF and stores the time and position of the caller in the queue so that this information will be available to the feature server when and if the caller should call back.

Other static fields which are defined on the screen are the Submit button 5040 which allows the caller to transmit a completed IGF to the feature server; a Cancel button 5050 which cancels the IGF and a Work Offline button 5060 which tears down the current H.323 call but allows the caller the option to "Reconnect" later at the same or higher queue position. The "Call Me Back" button 5070, will be discussed below with the queuing process which causes the current H.323 call to terminate but which allows the call to remain in the queue with a request that the called subscriber return the call at a later time. Call-back requests are placed at the bottom of the call queue, as is described below.

FIG. 5c shows the IGF after the caller has changed its content while offline". After selecting the "Work Offline" option the IGF contains the window field "Reconnect" 5120 to permit the caller to restore communication with the called subscriber's operator and the window field "e-mail Submit" 5100 to permit the caller to send the information in the IGF to the called subscriber by email.

Figure 6:
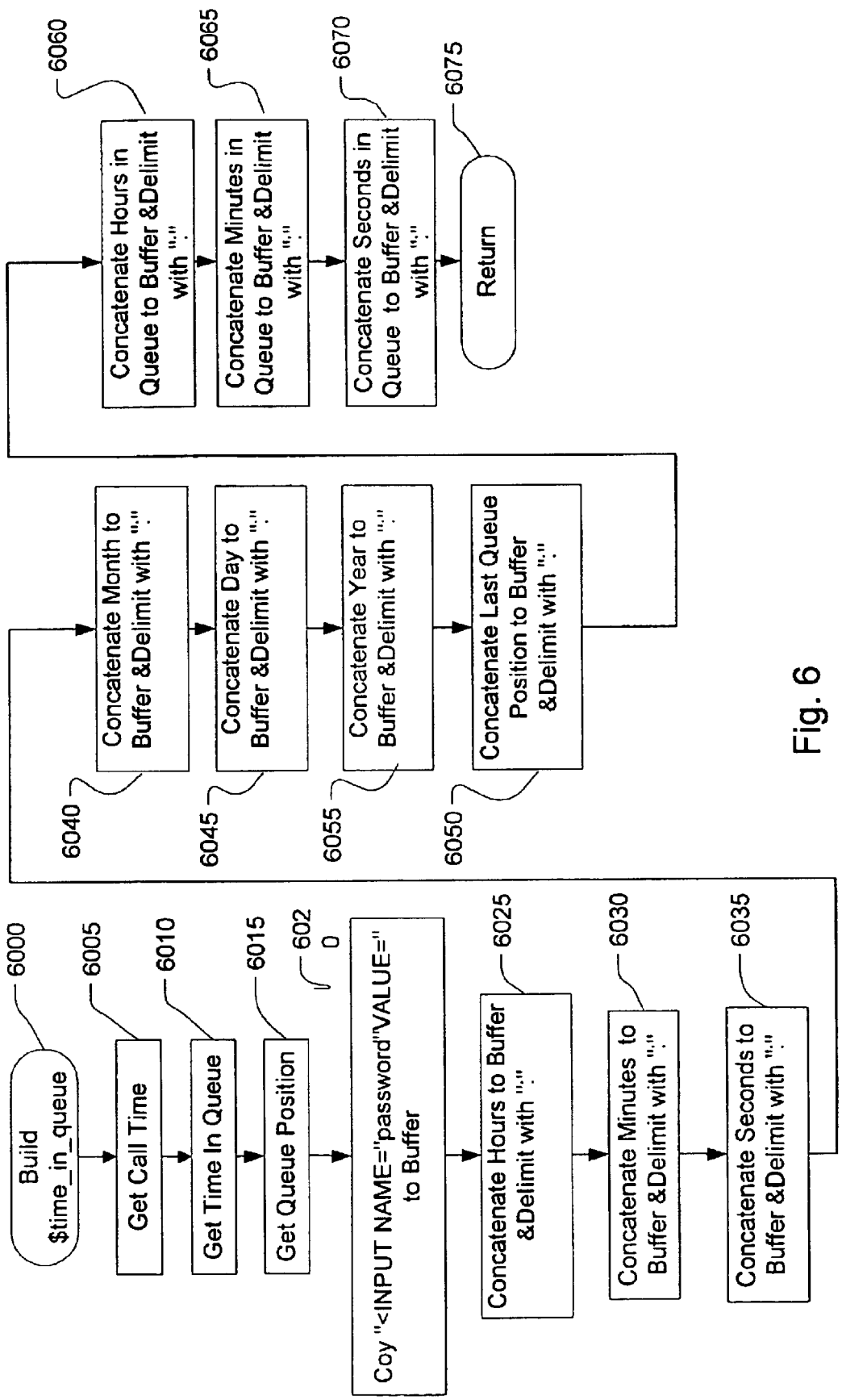
FIG. 6 is a flow chart for the feature server's construction of a time-in-queue message.

As mentioned, storing a caller's time in queue in the IGF facilitates changing the queue position of a follow-up call made by the caller. This information may be stored in the IGF by the feature server inserting a CGI script in a format that is not readily visible to the calling party or by inserting a cookie containing multiple parameters in the calling party's browser. However, because some browsers are programmed to reject cookies, the stored CGI script is preferrable. Referring to FIG. 6, the CGI script is generated by Build_time_in_queue routine which begins at 6000. The current time is retrieved and stored in a local variable at 6005. At step 6010, Get_TimeIn_Queue the time that the current referenced caller has spent in the queue is stored in a local variable. At step 6015 the position of the selected call in the queue in relation to other callers is stored in a local variable. The first step in building the CGI script string is to copy the string "<INPUT NAME="password"VALUE=" to a buffer as shown in step 6020. At 6025, the current time in hours is concatenated to this string followed by an ":". Next, at 6030, the current minutes followed by an ":" is concatenated to the string. At 6035 the current time seconds followed by an ":" is concatenated to the string. Similar steps are taken in the next three steps to concatenate month, day, and year to the CGI script string, as shown in 6040, 6045, and 6050 respectively. The current queue position of the call is then concatenated to the string and delimited with a ":" as shown in 6055. Finally the hours, minutes, and seconds in the queue are concatenated to the string as shown in 6060, 6065, and 6060 respectively. When the CGI strings are completed they are stored in the caller's IGF ready to be parsed by the feature server when the caller makes a return call.

Figure 7:
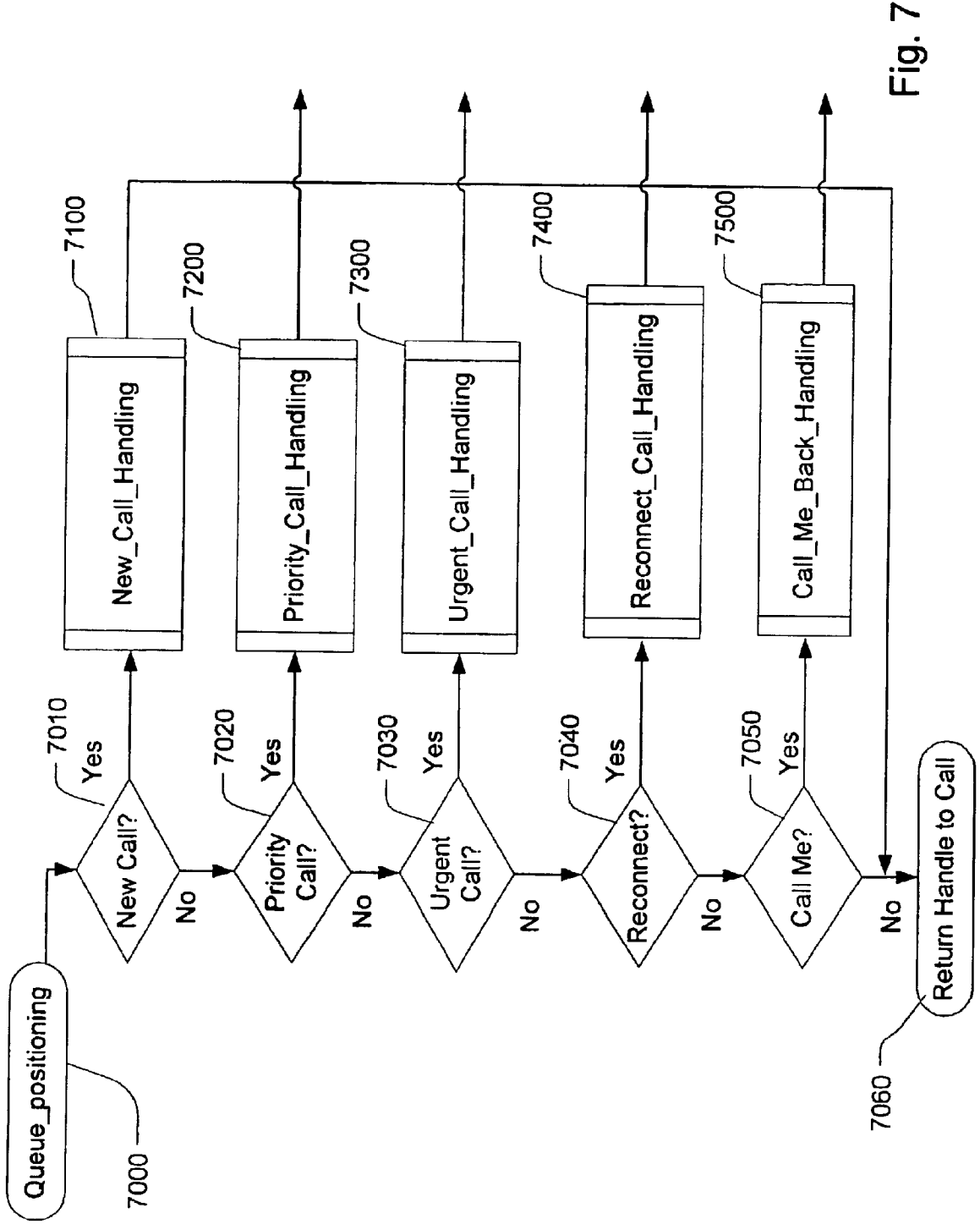
FIG. 7 is a flow chart for the main queue positioning routine.
Figures 1, 7:
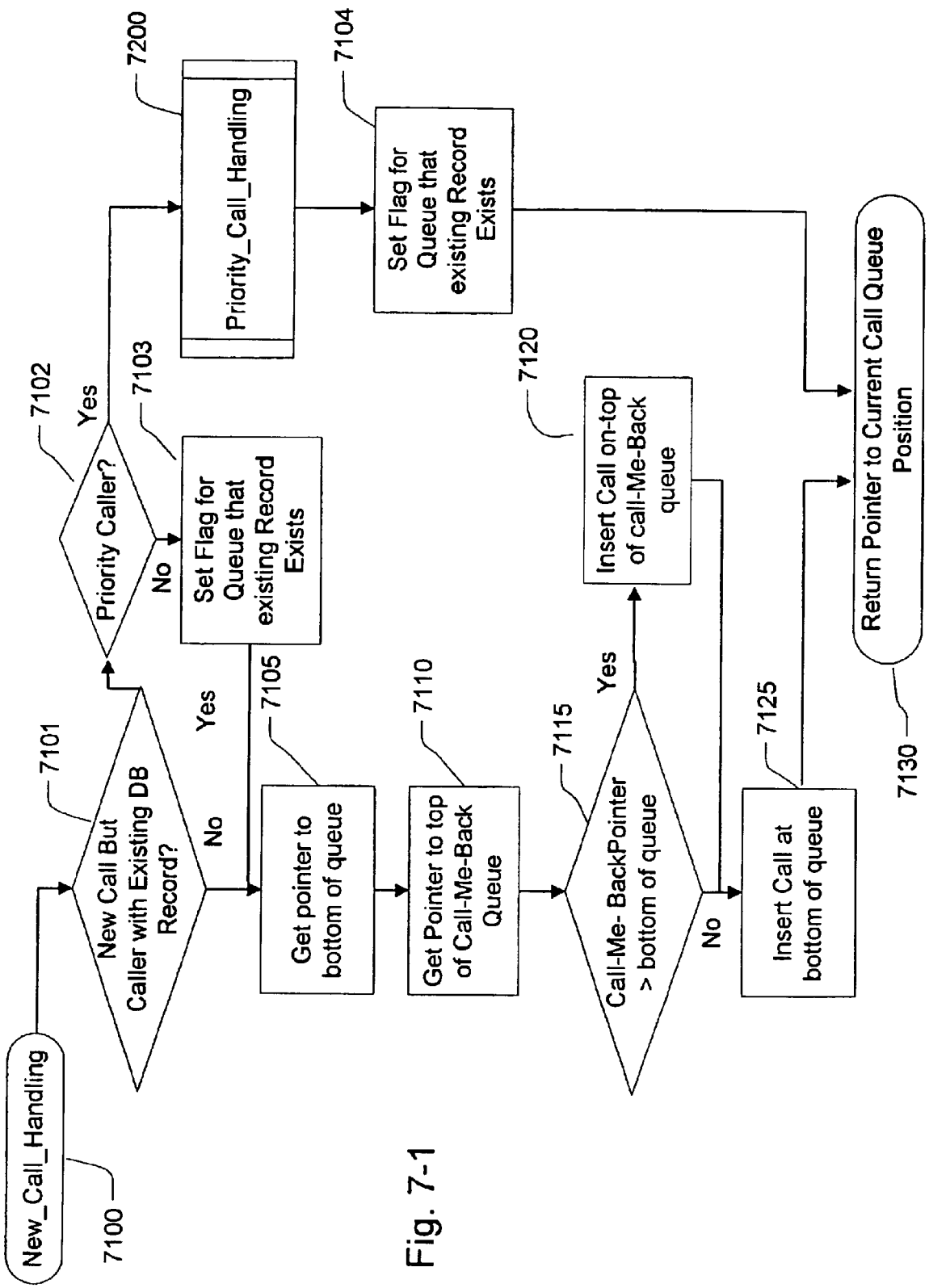
Figures 2, 7:
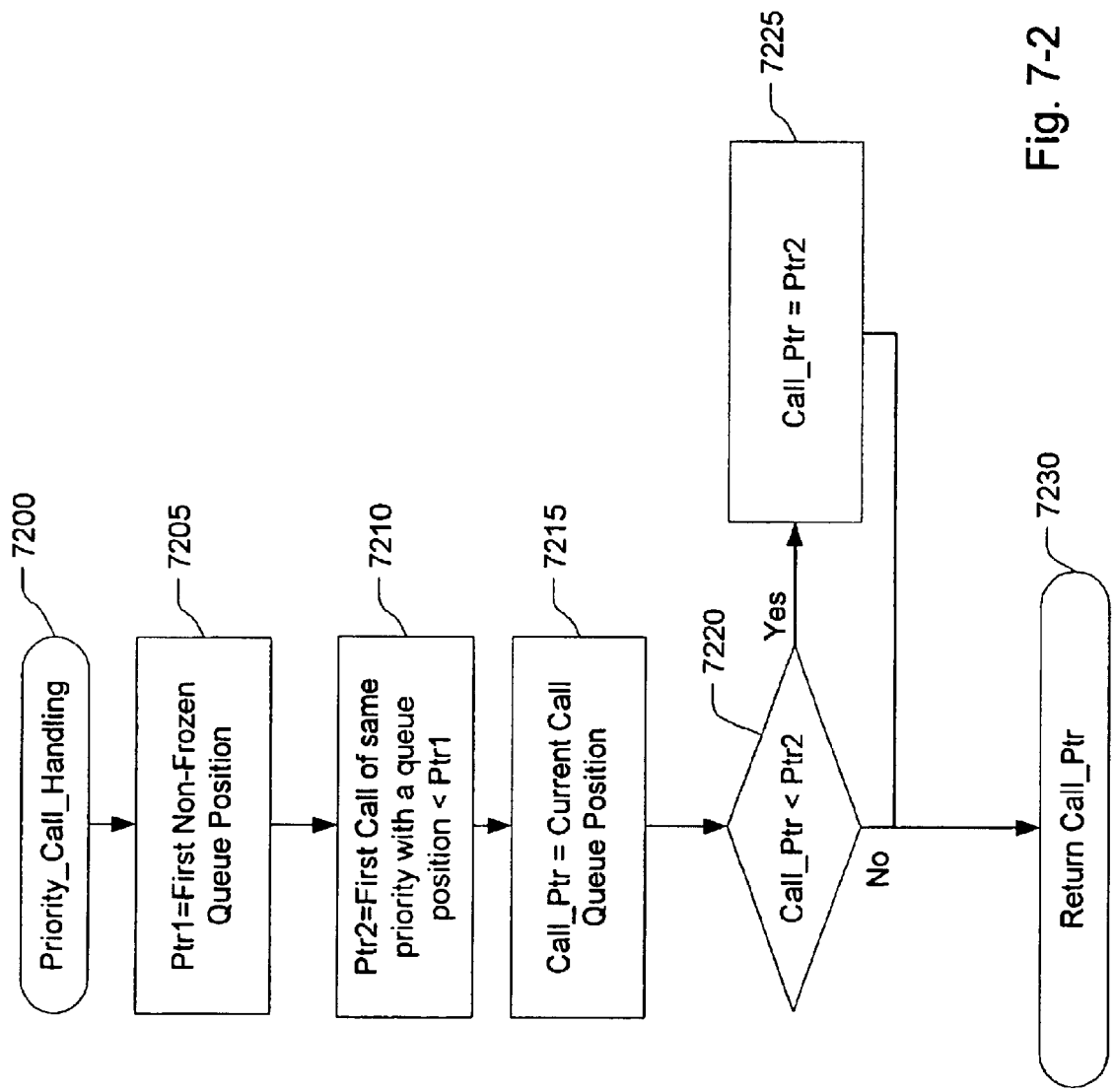

FIG. 7 shows the steps for positioning a call in the main call queue. To better understand the manner of queuing, it is helpful to understand the meaning of a "frozen" call. The term "frozen" refers to applying software limits on the queue so that a particular call in the queue can not arbitrarily be moved down in priority but may, however, move "up" in the queue, as is described in FIG. 7-6. Once a call has been marked as frozen, the queuing software will not automatically place another call in front of (on top of) this particular call. This prevents a caller from being continuously bumped to lower positions in the call queue if a plurality of predefined "more important" calls arrive in sequence while the caller is in queue. This prevents new callers or callers without a predefined call priority from never being answered and "hanging up" which is an important consideration for call center or other similar business applications. As has been mentioned above with respect to FIG. 4c, freezing a call is a software limitation and may be over-ridden. A call is marked as frozen by setting a Call Frozen Flag (CFF) to a logical one. It is cleared by setting the CFF to a logical zero. The priority of a call is referenced in the FIG. 3c-2 description which is the parsing and interpretation of the IGF form transmitted from the calling party to the feature server. The insertion of a call in the "call queue" with respect to the CFF is referenced throughout the description of FIG. 7.

At 7010 a new call is detected and handed off to the New_Call_Handling routine 7100 whose steps are detailed in FIG. 7-1. If this is not a new call, step 7020 determines whether this is a priority call and, if so, hands off control to the priority call processing 7200 whose steps are detailed in FIG. 7-2. If this is not a priority call, step 7030 determines whether this is an urgent call, as indicated by the caller having checked the "Urgent Call" box 5080 in the IGF, FIG. 5b. If so, control is passed to "Urgent Call Handling" 7300 whose steps are detailed in FIG. 7-3. If this is not an urgent call, step 7040 determines whether this is a reconnect call, as indicated by the caller having checked the "Reconnect" box 5120 in the IGF. If so, control is passed to "Reconnect Call Handling" 7400 whose steps are detailed in FIG. 7-4. If this is not a reconnect call, step 7050 determines if this is a call me back call, as indicated by the caller having checked the "Call me back" box 5070 in the IGF. If so, control is passed to "Call Me In Back Handling" 7500 whose steps are detailed in FIG. 7-5. If this is not a call me back call, the handling of the call continues at 7060.

Referring now to FIG. 7-1, the steps for handling a new call are shown. At 7105 a pointer is set to the bottom of the call waiting queue. At 7110 the pointer is set to the top of the call me back queue. Step 7115 determines whether the call me back pointer is above the bottom of the queue. If so, the call is inserted above the position ascertained in step 7117. If the call me back pointer is at the bottom of the queue, step 7125 inserts the call at the bottom of the queue and the pointer is returned to its default position.

In FIG. 7-2 the steps for handling a priority call are shown. At 7205 a first pointer, ptr1, is set to the first "non-frozen" queue position. (Frozen queue positions are described in FIG. 7-6.) At 7210 a second pointer, ptr2, is set to point to the first call of the same priority having a queue position lower than that of the first pointer. At 7215, the call pointer is set to the position of the current call in the queue. Step 7220 then determines whether the call pointer set in step 7215 is below that of ptr 2. If so, the call pointer is set in step 7225 to the position indicated by ptr 2 and in step 7230 the call pointer is set to its default position.

Figures 3, 7:
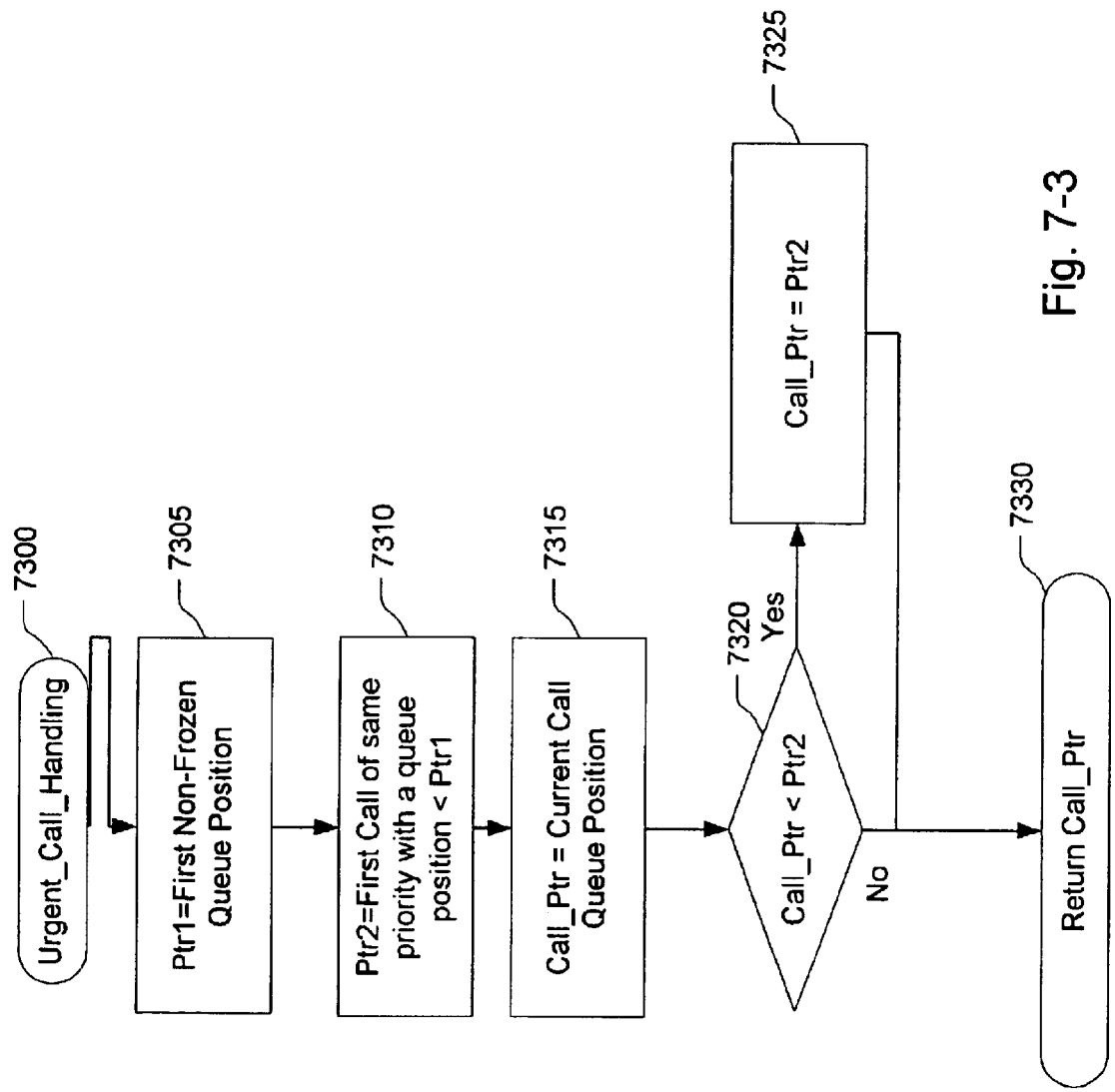

In FIG. 7-3 the steps for handling an urgent call are shown. At 7305 a first pointer, ptr1, is set to the first "non-frozen" queue position. (Frozen queue positions are described in FIG. 7-6.) At 7310 a second pointer, ptr2, is set to point to the first call of the same priority having a queue position lower than that of the first pointer. At 7315, the call pointer is set to the position of the current call in the queue. Step 7320 then determines whether the call pointer set in step 7315 is below that of ptr 2. If so, the call pointer is set to the position indicated by ptr 2 in step 7325 and at step 7230 the call pointer is set to its default position.

Figures 4, 7:
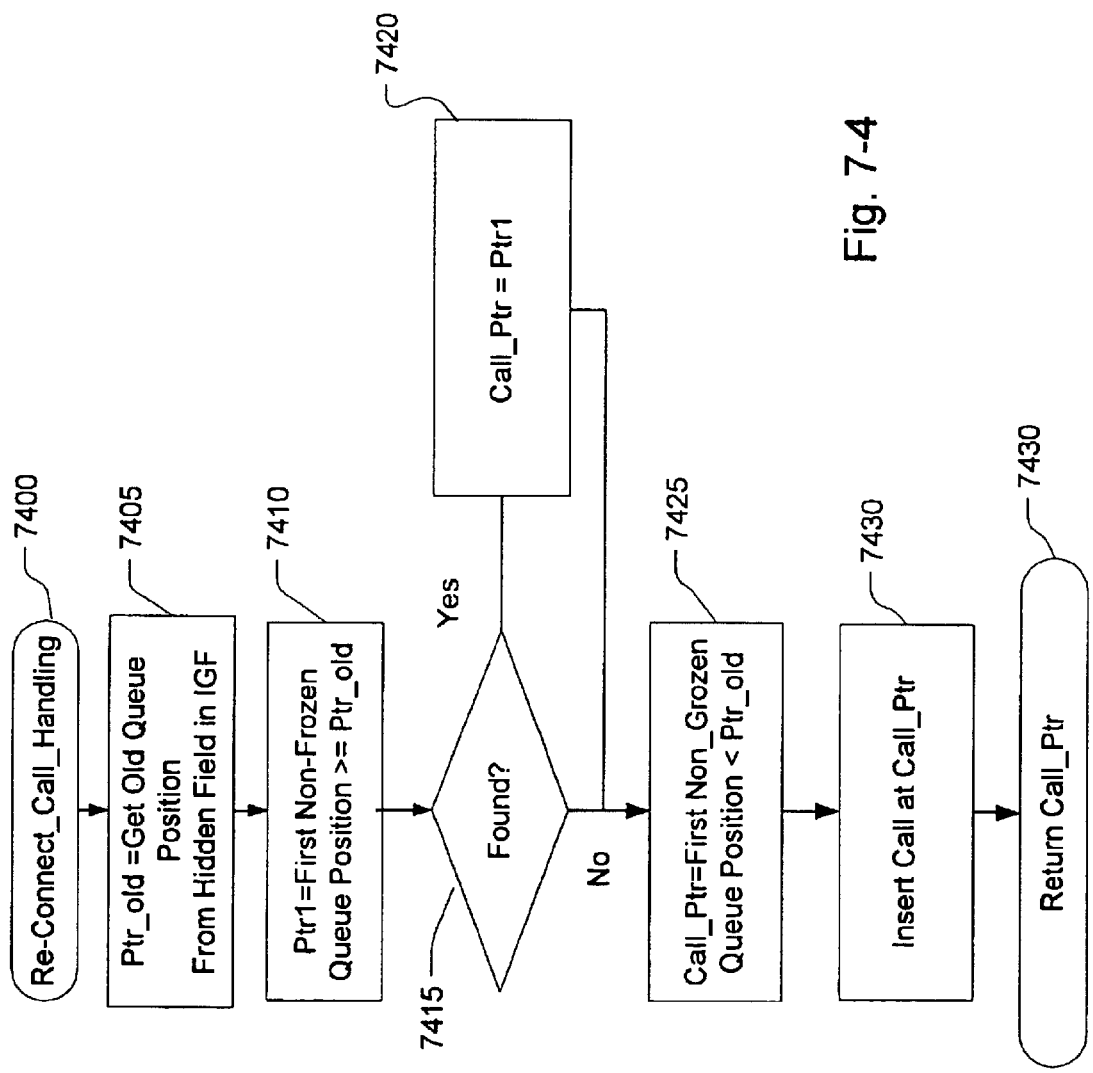

In FIG. 7-4 the steps for handling a reconnect call are shown. At 7405 a first pointer, ptr_old, is set to the queue position that the call had on the previous call. This is obtained from field 5090, FIG. 5b of the IGF. At 7410 a second pointer, ptr1, is set to the first "non-frozen" queue position that is above the position of ptr_old. Step 715 determines whether there is space available at the place indicated by ptr1. If so, the call pointer is set to the value of ptr1 in step 7420 and control passes to step 7425. Step 7425 sets the call pointer to point to the first non-frozen queue position that is below the old pointer. Step 7430 inserts the call at the position indicated by the call pointer and in step 7430 the call pointer is set to its default position.

Figures 5, 7:
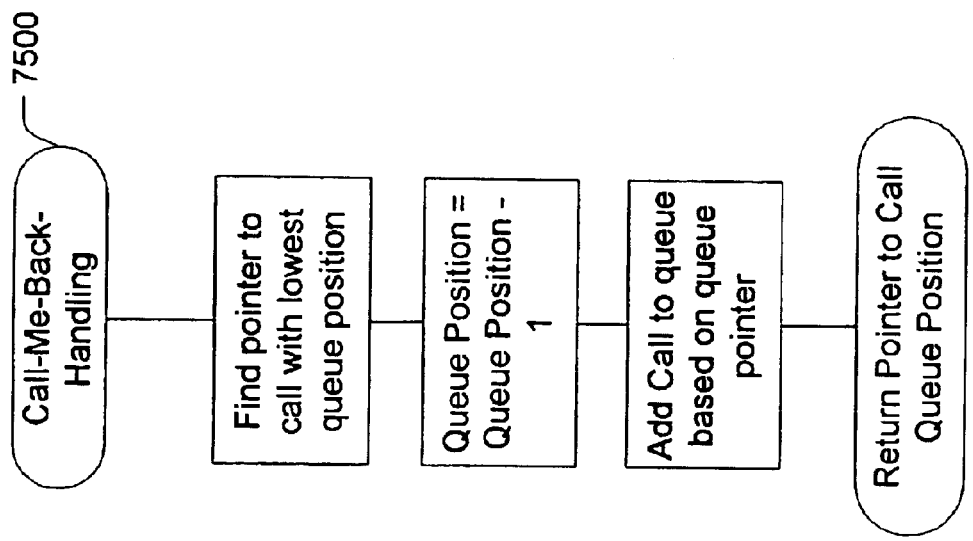
Figures 6, 7:
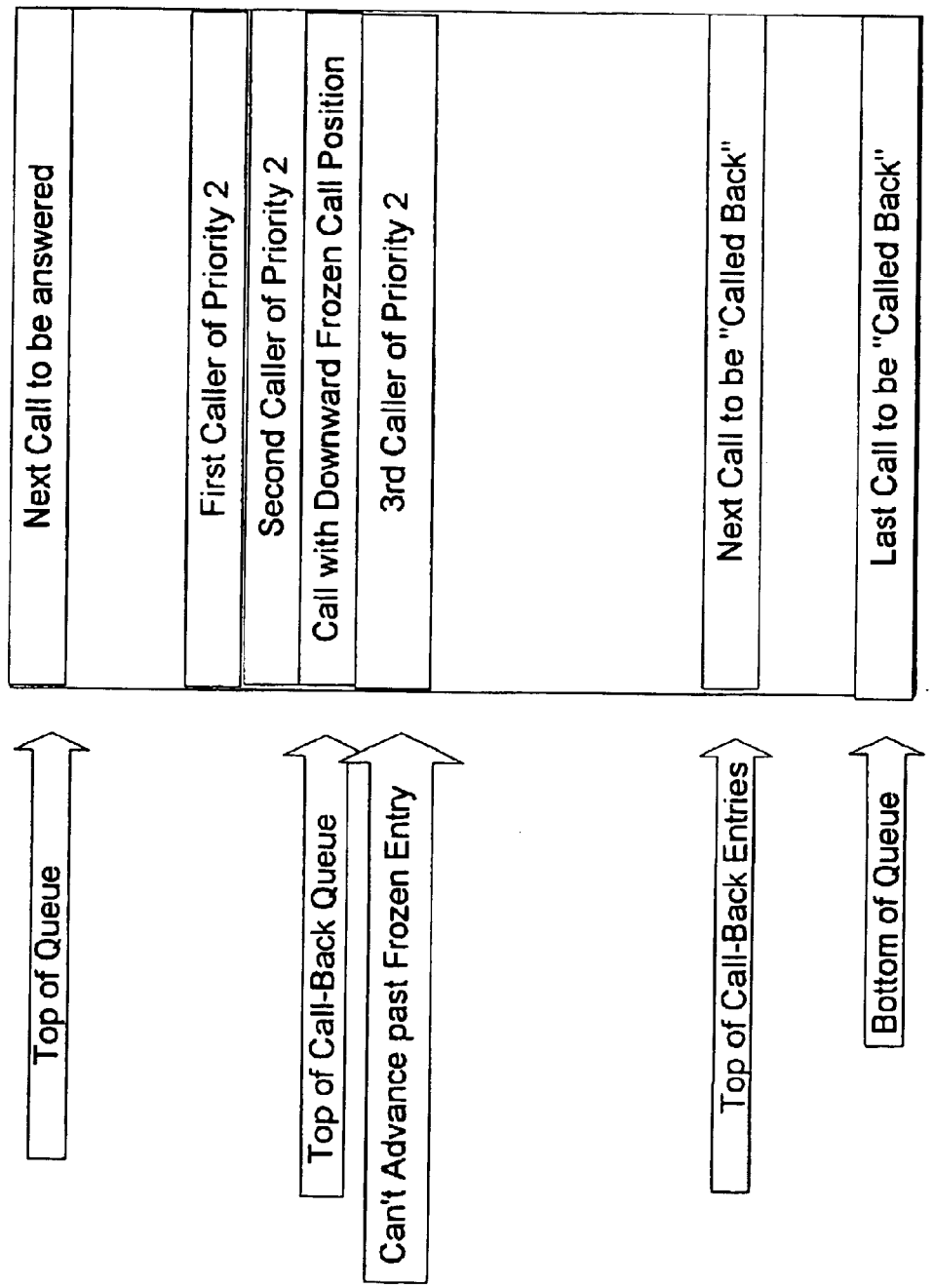

In FIG. 7-5 the steps for handling the call me back call are shown. At 7510, the call pointer pointing to the cal in the lowest queue position is found. At 7515 the queue position is set to the position of call pointer found in step 7510. In step 7520 the call is added to the queue based on the position of the pointer indicated by step 7510 and at step 7530, the pointer is returned to its default position.

FIG. 7-6 shows the relative position of calls in the queue. 7600 shows that the next call to be answered is at the defined top of queue. The last call to be answered, when calls are answered based on queue priority, is shown in 7610. This diagram indicates that active calls take priority over a request to have an operator "call the calling party back". The first call in the queue to be called back is the call just under the last active call in the queue, as shown in 7620. New incoming calls will always be placed on top of these call back requests. The last call to be processed is the "Call Back" request in 7630. Placing "Call Back" requests in the queue solves a common business problem of logging callers, and more importantly customers, who have requested a call. In essence, placing the "Call Back" requests in the queue forms the basis of what is often entered into a contact manager of a called party. That is, "Call Customer X back. They called at Y time".

What has been described is deemed to be illustrative of the principles of the invention. It should be apparent that numerous modifications may be made such, for example, as including the functionalities attributed to feature server 160 in the same physical apparatus as gateway 130, and vice versa. It should also be understood that, instead of using IP protocol, ATM, Frame Relay, SONET, or other communications protocols may be used. Instead of the conventional softphone H.323 protocol, other protocols such as SIP or MGCP may be used. Furthermore, those skilled in the art will realize that H.323 can be extended, or a new protocol can be created to encompass both the standard H.323 messages and the additional messages described herein. With respect to the OOB messages, instead of HTTP, file handling across the packet network may be handled by any of several well-known techniques such as TCP/IP, Common Gateway Interface (CGI), Hyper Text Markup Language (HTML), Dynamic HTML (DHTML), JAVA, Microsoft's VB script, Java Script, Microsoft's Internet Server Application Programming Interface (ISAPI), or Microsoft's Active Server Pages (ASP) enabled web pages which communicate with a server over HTTP may also be used with equally advantageous results. Further and other modifications may be made by those skilled in the art without, however, departing from the spirit and scope.

What is claimed is:

1. A packet switched call center communications system for delivering voice over Internet Protocol telephone calls to any of a plurality of attendant positions serving a subscriber, comprising:

feature server means operable incident to an incoming call arriving to said subscriber for submitting a respective subscriber-defined questionnaire to a caller, said means including a data base administrable by said subscriber, said means permitting formulation of said questionnaire and access to said data base by any of said attendant positions;

said feature server processing a questionnaire returned by said caller including indexing the questionnaire according to the directory number of said caller to ascertain the nature or purpose of said call and conducting text spotting searches of said questionnaire to ascertain the name of a party associated with said subscriber and searching said data base to locate a directory number corresponding to said name; and, said feature server being responsive to said processing of said questionnaire for displaying to said attendant positions a queue of calls incoming to said subscriber, said display including the nature or purpose and priority of each incoming call.

2. A packet switched call center communications system for delivering voice over Internet Protocol telephone calls to any of a plurality of attendant positions serving a subscriber, comprising:

feature server means operable incident to an incoming call arriving to said subscriber for submitting a respective subscriber-defined Questionnaire to a caller, said means including a data base administrable by said subscriber, said means permitting formulation of said questionnaire and access to said data base by any of said attendant positions;

said feature server processing a questionnaire returned by said caller including indexing the questionnaire according to the directory number of said caller to ascertain the nature or purpose of said call; and said feature server being responsive to said processing of said questionnaire for displaying to said attendant positions a queue of calls incoming to said subscriber, said display including the nature or purpose and priority of each incoming call and said means controllable by any of said attendants for altering a priority accorded to any of the calls in said queue.

3. The packet switched call center communications system according to claim 2, wherein an individual call may be accorded a priority within the call queue that is frozen such that no subsequent call may reduce the individual call's position in the queue.

4. The packet switched call center communications system according to claim 2, wherein the calls in said queue may be accorded relative priorities according to a calling-party-defined urgent call status.

5. The packet switched call center communications system according to claim 4, wherein said call queue permits calls from return callers to be accorded a queue position which takes into account the call's queue position during a previous call.

6. The packet switched call center communications system according to claim 5, wherein a return call is advanced within the call queue to a value equal to its position in a previous call queue.

7. The packet switched call center communications system according to claim 4, wherein said call remains in the call queue at a lower priority following receipt of said a call back request.

* * * * *